US012770193B2

(12) United States Patent
Howorka et al.

(10) Patent No.: US 12,770,193 B2
(45) **Date of Patent: *Oct. 20, 2026**

(54) RANDOMIZATION OF ORDERS AT MATCHING IN ELECTRONIC TRADING SYSTEMS

(71) Applicant: Chicago Mercantile Exchange Inc., Chicago, IL (US)

(72) Inventors: Edward R. Howorka, Denville, NJ (US); Peter Robert Capuano, Ho-Ho-Kus, NJ (US); Michael Sean Merold, Sparta, NJ (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/090,916

(22) Filed: Mar. 26, 2025

(65) Prior Publication Data

US 2025/0225582 A1 Jul. 10, 2025

Related U.S. Application Data

(63) Continuation of application No. 18/599,686, filed on Mar. 8, 2024, now Pat. No. 12,288,258, which is a continuation of application No. 16/991,597, filed on Aug. 12, 2020, now Pat. No. 11,961,140.

(60) Provisional application No. 62/885,878, filed on Aug. 13, 2019.

(51) Int. Cl.

| | |
|---|---|
| ***G06Q 40/04*** | (2012.01) |
| ***G06F 17/18*** | (2006.01) |

(52) U.S. Cl.
CPC ............. *G06Q 40/04* (2013.01); *G06F 17/18* (2013.01)

(58) Field of Classification Search
CPC ......... G06Q 40/04; G06Q 30/08; G06F 17/18
See application file for complete search history.

(56) References Cited

U.S. PATENT DOCUMENTS

| | | | | |
|---|---|---|---|---|
| 11,397,985 | B2 * | 7/2022 | Taylor .................... | G06Q 40/06 |
| 12,437,339 | B2 * | 10/2025 | Bartko ................... | G06Q 40/04 |
| 2005/0075963 | A1 * | 4/2005 | Balabon ................. | G06Q 40/06 705/36 R |
| 2009/0018944 | A1 * | 1/2009 | De Verdier ............ | G06Q 40/06 705/37 |
| 2017/0046783 | A1 * | 2/2017 | Hosman ................. | G06Q 40/04 |

(Continued)

OTHER PUBLICATIONS

U.S. Appl. No. 18/599,686, filed Mar. 8, 2024.
U.S. Appl. No. 16/991,597, filed Aug. 12, 2020.

*Primary Examiner* — Matthew S Gart
*Assistant Examiner* — William D Newlon
(74) *Attorney, Agent, or Firm* — Lempia Summerfield Katz LLC

(57) ABSTRACT

The disclosed embodiments relate to a latency floor mechanism for processing incoming orders to an electronic trading system which impart a delay on orders, not when they are received, but when they are matched by the match engine/CLOB thereby imparting zero added latency between order submission/modifications/cancellations and price market data publication by the electronic trading system because the disclosed randomization processing delay applies only to matched orders, which represent a small fraction of the market events.

20 Claims, 7 Drawing Sheets

(56) References Cited

U.S. PATENT DOCUMENTS

| | | | | |
|---|---|---|---|---|
| 2020/0090272 | A1 * | 3/2020 | Katsuyama ............ | G06Q 30/08 |
| 2020/0349645 | A1 * | 11/2020 | Gunzinger ............. | G06Q 40/04 |

* cited by examiner

RANDOMIZATION OF ORDERS AT MATCHING IN ELECTRONIC TRADING SYSTEMS

RELATED APPLICATIONS

This application claims priority to and is a continuation of U.S. patent application Ser. No. 18/599,686, filed Mar. 8, 2024, now U.S. Pat. No. 12,288,258, which claims priority to and is a continuation of U.S. patent application Ser. No. 16/991,597, filed Aug. 12, 2020, now U.S. Pat. No. 11,961,140, which claims the benefit of the filing date under 35 U.S.C. § 119(e) of U.S. Provisional Application Ser. No. 62/885,878, filed Aug. 13, 2019, the entirety of which are incorporated by reference herein and relied upon.

BACKGROUND

Over the last twenty years, electronic trading systems have become commonplace in the financial markets for trading a wide variety of instruments such as equities, foreign exchange (FX) products, commodities and derivatives as well as fixed income products and many other financial instruments.

Trading systems generally ensure open market access to all traders and provide a variety of methods from which traders may choose to connect to the system to send orders and receive market data. In particular, trading systems ensure equitable access to connections (ingress points) to their system and ensure that the network infrastructure of the electronic trading system which carries communications from those connections to the actual systems which implement the electronic market operates in a manner which maintains equitable access.

However, traders, who may be located a significant distance away, connect with these electronic trading systems via public and/or private electronic communications networks, which are neither provided by, nor under the control of, the electronic trading systems, which enable traders to submit trade orders and receive the results thereof. However, latency issues, such as inter- and/or intra-network latency variations, may be present in any system connecting parties over large distances, in particular, where some traders are located further from the electronic trading system than others.

Some electronic trading systems use distributed architectures to locate system components geographically proximate to the traders in order to address these latency issues and improve access as compared to centralized systems by minimizing differences in the distance from each trader to a connection to the electronic trading system and/or to the systems which implement the electronic markets so as to minimize the impact of any latency issues. However, other latency issues have been identified which may occur outside of the control of the electronic trading systems, e.g. outside of the electronic trading systems' networks and processing systems.

Generally speaking, traders receive and process information, such as changes to a given market or other event, in order to make trading decisions, i.e. whether or not to submit an order to trade and what that order should contain. Accordingly, as will be described in more detail below, in terms of responding to changes in a market, there are three general latency components, variations in which may affect a trader's ability to capitalize on a given event at all, or as compared with other traders: the latency in learning about the event, e.g. the latency from the time the event occurs until the trader receives data indicative thereof from the electronic trading system; the latency in consuming/processing the received information and generating a suitably responsive order; and the latency in communicating/transmitting the generated order back to the electronic trading system.

For example, the rise of algorithmic trading has highlighted other issues with respect to latency which impact a trader's ability to trade. Algorithmic trading, also known as High Frequency Trading (HFT), replaces human traders with electronic platforms that enter orders automatically in accordance with a trading algorithm. The algorithmic trading generates orders in response to received market data, such as the price or size of orders in the market. Generally, HFT trading attempts to capitalize on/minimize all three areas of latency external to the electronic trading system: receipt of market data from the electronic trading system; processing of received market data to generate one or more transactions responsive thereto; and transmission of those generated transactions back to the electronic trading system.

In both centralized and distributed systems, such as the EBS or CME systems described below, market data/views may be sent to each trading entity, such as a bank's trading floor, periodically giving that trading entity an update of the market/order book for traded instruments. These market views may then be redistributed, in turn, to other traders, or to other trading floors, impacting the first traders/trading floors that receive market views less than traders/floors that receive the views later, and in particular, less than the last trader/trading floor to receive the market update. Latency issues caused in part by the relative proximity of the traders/trading floors to the computers distributing the market data/views external to the electronic trading system can exacerbate this impact differential. This problem is dealt with, to an extent, by the distribution method and apparatus disclosed in U.S. Pat. No. 8,446,801 Howorka et al, the contents of which are incorporated by reference. Howorka et al. introduces a random component into the order in which market updates are distributed so that the time at which a given trading floor receives market data relative to other trading floors gradually changes over time. This approach goes some way to evening out variations in the impact of latency over time.

Thus, known electronic trading systems have used some measures to address latency issues with respect to the receipt of information, referred to as information access, and to address variations in the impact of latency on access to the system which may occur outside of the control of the trading system. However, they are unable to deal with discrepancies in the speed at which parties trading on the system can generate and transmit orders into the system, which is largely out of the control of the trading system operator.

In view of the operational speed of many financial markets, a strong motivation exists for trading entities, such as hedge funds and banks, to invest heavily in hardware, software, and communications technology to ensure that they can respond to market events quickly, e.g. generate appropriate orders responsive to market data, and ensure that their orders reach the trading system as quickly as possible. This approach requires a heavy financial investment on behalf of the trading entities which tends to minimize the impact of latency issues on the larger entities which are more able to make the investment required. The problem can be less severe on systems that operate on a private communications network but worse on systems that use a public network, such as the Internet, where latencies may vary both over time and over distance, both over a single network route and as between multiple network routes, for communications between the trading entities and the trading system.

In particular, in certain scenarios, referred to as "races", the fastest (lowest latency) trader (or trading program) may garner an advantage over other traders, e.g. they may have certainty of achieving their objective. Generally, a market may involve market makers, such as market participants who consistently provide bids and/or offers at specific prices in a manner typically conducive to balancing risk (a market maker may also be referred to as a passive trader and/or one who places trades at prices at which no previously received but unsatisfied counter orders exist at the time the trade order is submitted wherein such orders are most likely not to match with a counter order upon submission and will be rested on/stored in the order book, e.g. as a previously received but not yet satisfied order), and market takers who may be willing to execute transactions at prevailing bids or offers or may be characterized by more aggressive actions so as to maintain risk and/or exposure as a speculative investment strategy (a market taker may also be referred to as an aggressive trader, or aggressor, and/or someone who places trades at prices at which previously received but not yet satisfied counter orders exist at the time the trade order is submitted wherein such orders are most likely to be matched with a counter order upon submission thereby taking those counter orders out of the order book). From an alternate perspective, a market maker may be considered a market participant who places an order to sell at a price at which there is no previously or concurrently provided counter order, thus the order is likely to rest on the order book. A market taker may be considered a market participant who places an order to buy at a price at which there is a previously or concurrently provided counter order, thus the order is likely to trade immediately. A balanced and efficient market may involve both market makers and market takers, coexisting in a mutually beneficial basis. The mutual existence, when functioning properly, may facilitate liquidity in the market such that a market may exist with "tight" bid-ask spreads (e.g., small difference between bid and ask prices) and may also feature high volumes of executed transactions indicating that large quantity orders may be executed without driving prices significantly higher or lower.

The scenarios referred to above may be categorized as a Maker-Maker race, a Maker-Taker race and a Taker-Taker race. In a Maker-Maker race, when a market price falls (or rises), market makers try to submit new offers (or bids) competing for the best position in the order queue at the new lower (higher) price, wherein the fastest market maker becomes the first in the queue at the new price. In a Maker-Taker race, when market price rises (or falls), market makers try to cancel their offers (or bids), while market takers try to trade against them, wherein the fastest trader achieves his objective: The market maker is able to cancel his offer (bid); or the market taker is able to trade against the offer (bid) at good price before the order is cancelled. The Maker-Taker race may be biased toward market takers (as a whole) because—at a given time—there is a limited (small) number of market maker orders, while the number of market taker orders in a salvo unleashed in response to a market price change can be practically unbounded. In a Taker-Taker race, when market price rises (or falls), market takers try to trade against the latent/resting offers (bids), wherein the fastest market taker has the greatest chance of trading with an order at a latent/resting price.

U.S. Pat. No. 7,461,026 assigned to Trading Technologies, Inc. attempts to address the issue of the impact with respect to latency delay affecting information access and turnaround of trade orders. U.S. Pat. No. 7,461,026 is incorporated herein by reference as if set out in full. Market data is sent from a host system to client devices through synchronized local communication services so that data can be displayed simultaneously or near simultaneously at each client device. It will be appreciated that a multicast protocol may be used to achieve the same effect. Transaction data sent from the client devices to the host system also is received via the local communication servers and the ordering of that transaction data is based, at least in part, on when the local communication servers received the transaction data from the client devices, as opposed to when the host system receives that data. The transaction data may include order information and the transaction messages may be prioritized by determining a travel time from a first network device to the host exchange and then determines a similar travel time for a second device. When a transaction message is sent from a first client device the receipt time is determined. Similarly, the receipt time of messages from the second device is measured and the host system can then use the known travel times for the two devices to prioritize the first and second transaction messages at the host exchange.

While this approach goes someway to addressing the issue, it is complex and relies on a fore-knowledge of travel times and a constancy of travel time for repeated transactions from the same device. The approach may not be able to cope well with orders submitted from mobile devices such as tablets or phones which are beginning to be used in the markets as travel time will vary depending on the location of the device.

A Latency Floor (also referred to as Randomization as described in Harris, L. What to Do about High-Frequency Trading. Financial Analysts Journal, March/April 2013, Vol. 69, No. 2:6-9 and Szalay, E. Life in the slow lane, Automated Trader Magazine Issue 30 Q3 2013, both of which are incorporated by reference in their entireties herein) can be thought of as a limited exception to the time-priority rule an electronic trading venue implements. The outcome of deploying a latency floor mechanism on a venue that operates a central limit order book (CLOB) is that at short timescales, messages are not generally processed against the CLOB (e.g., inserted into it, matched against other orders in it, removed from it, and so on) in the received temporal order. At longer timescales however, messages received earlier are still processed against the CLOB before messages received later. What this implies is that there is a time parameter associated with a latency floor that distinguishes the short timescale from the long timescale, which is sometimes referred to as the "value" of the latency floor.

A latency floor mechanism may work by "batching" up or otherwise buffering messages received within the floor's value, e.g. time or batch window, before those messages are sent to or otherwise reach the match engine/CLOB, shuffling the orders/list of messages in the batch to give the orders/list a new (at least somewhat) random ordering, and then finally processing these messages against the CLOB, i.e. performing the matching process, according to their new random ordering. In this way, the order in which the messages are processed against the CLOB is no longer completely determined by the received temporal order and the incentive to traders to get their order in as quickly as possible is reduced as they will be batched with later received orders regardless. Other such mechanisms may instead work by adding a random delay between 0 and the (floor) value to each message when it is received and before it can be processed against the CLOB, thereby also causing a new, more random ordering of messages, as described in Harris, L. What to Do about High-Frequency Trading. Financial Analysts Journal, March/April 2013, Vol. 69, No. 2:6-9.

Conventional latency floor mechanisms do not completely eliminate the advantage of being able to respond faster than the value of the floor. In other words, on an electronic trading venue implementing a conventional latency floor mechanism, there is still incentive for market participants on that venue to be able to respond in less time than (i.e., be faster than) the value of the floor, and indeed to be the absolute fastest. For example, in one such conventional mechanism, if the value of the floor is 2 milliseconds (ms), and the faster participant responded 1.8 ms ahead of the slower participant, the faster participant's message will still have a greater than 90% chance of being processed against the CLOB before the slower participant's message. Consequently with conventional latency floors, and although to a lesser degree than with strict time-priority processing of messages, there is still incentive to invest in technology to be the absolute fastest participant and market operators still need to monitor and control venue latency at increasing levels of precision.

Current latency floor mechanisms may have one or more of the following disadvantages. Significant delays (of up to 5 ms or more) are introduced in the order processing, i.e. the processing of all orders whether they end up matching or not, and the resulting market data (as measured from the submission time of the order message including the order by the customer). Several fake liquidity phenomena may be present, such as, new liquidity (new bids/offers) are unnecessarily hidden from the market because of the latency floor window delay. Also, removed liquidity (cancelled or dealt quotes) are unnecessarily maintained in the market because of the latency floor window delay. And phantom bids/offers are published when the latency floor batch is published and quotes that are matched in the same batch are shown in the streaming market data. Additionally batching of incoming order messages prior to submission orders contained therein to the match engine(s) often results in unnatural bursts of market data emitted by the match engine(s). Further, batch processing decreases the efficiency of the match engine(s) and adds additional latency over and above the latency floor window.

There is, therefore, a need for an improved approach to the problem of the impact of latency on order entry into electronic trading systems.

DETAILED DESCRIPTION

Figure 1:
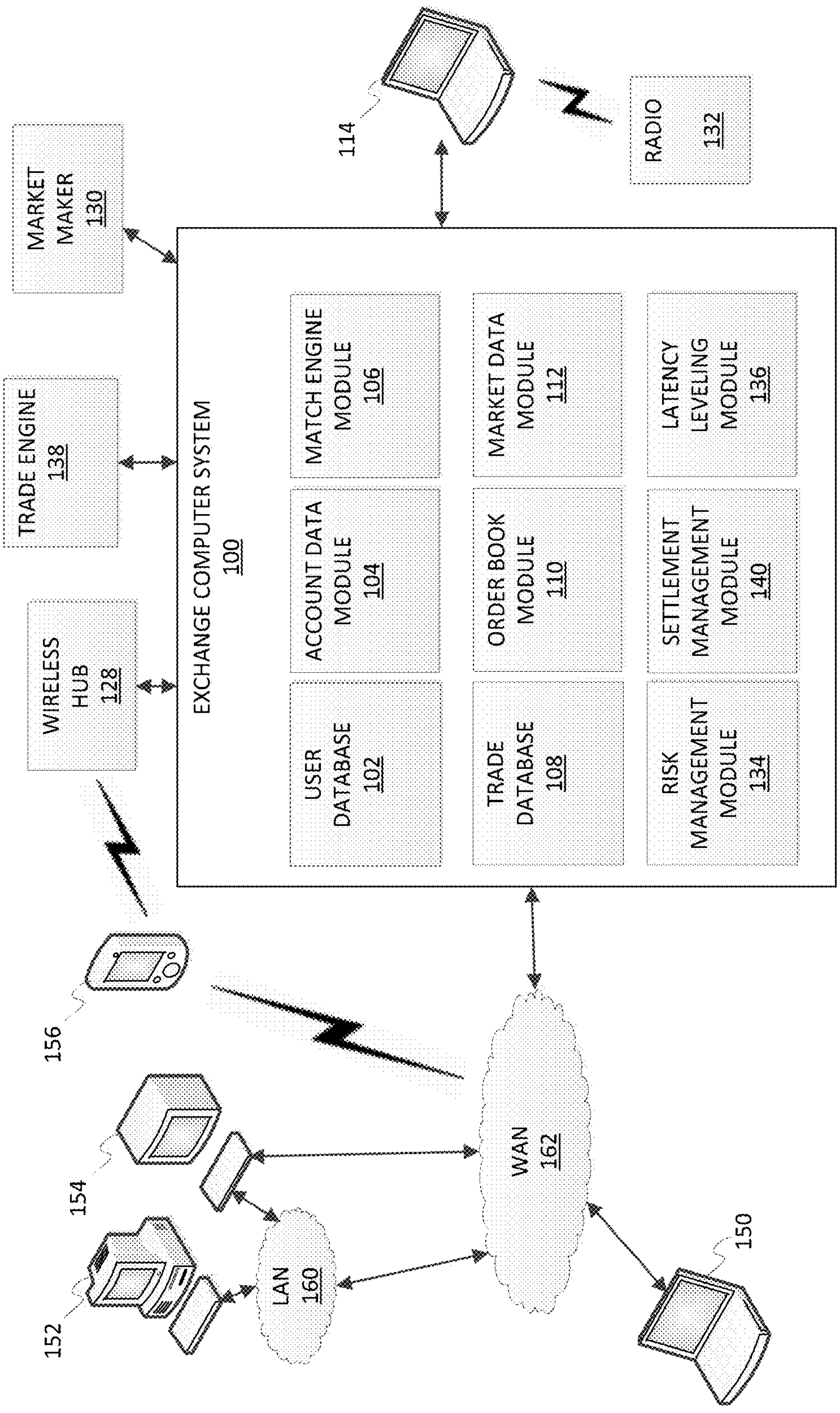
FIG. 1 depicts an exchange computer and network system, according to some embodiments.

The disclosed embodiments relate to matching engine architectures, for processing incoming orders to an electronic trading system, which feature a latency floor mechanism which impart a delay on incoming orders, not when they are received, but when they are matched by the match engine/CLOB, thereby imparting zero added latency between order submission/modifications/cancellations and price market data publication by the electronic trading system. Matching represents a small fraction of the market events which occur in an electronic trading system. Accordingly the disclosed embodiments minimize the impact on incoming orders, not delaying the majority of orders for which latency is irrelevant.

The disclosed embodiments address the race conditions noted above, e.g. the Maker-Maker, Maker-Taker, and Taker-Taker races, by: randomizing execution of passive orders to remove the fastest maker advantage, which may address the Maker-Maker Race; prioritizing and/or randomizing order cancellations to eliminate "quote sniping" by fast takers and tighten bid-offer spreads, which may address the Maker-Taker Race; and randomizing execution of only closely received aggressive orders that have matched with one or more resting orders to remove the fastest taker advantage, which may address the Taker-Taker Race. As noted above, aggressive/taker orders which do not match with a resting order are not delayed.

The disclosed embodiments provide a technical improvement over other latency equalizing mechanisms, e.g., mechanisms which attempt to minimize the impact of variations in external network latency and order processing capacity across all traders, by selectively imposing delay on only a subset of incoming transactions for which a narrow latency window has created a contest for the success of the transaction, as opposed to delaying all or a subset of incoming transactions regardless of whether or not latency is a factor in the success of that transaction. As was described above, other latency equalization mechanisms buffer or otherwise collect incoming transactions, or subsets thereof, into batches from which they are subsequently processed for matching. However, this imparts a delay on all of the buffered incoming transactions which may impair the overall processing ability of the electronic trading system to process transactions and generate and transmit the results thereof. The disclosed embodiments, in contrast, do not delay all transactions but, instead, delay only those transactions which match with a previously received but unsatisfied transactions. In this way, the electronic trading system is enabled to process most incoming transactions in real time, i.e. as they are received, with only a small fraction being delayed as will be described. The disclosed embodiments further represent a practical application of a latency equalization mechanism which selectively delays incoming transactions so as to minimize processing delays by the electronic trading system.

The disclosed embodiments may be implemented in association with a data transaction processing system that processes data items or objects, such as an exchange computing system which implements electronic trading, also referred to as an electronic trading system. Customer or user devices (e.g., client computers) may submit electronic data transaction request messages, e.g., inbound messages, to the data transaction processing system over a data communication network. The electronic data transaction request messages may include, for example, transaction matching parameters, such as instructions and/or values, for processing the data transaction request messages within the data transaction processing system. The instructions may be to perform transactions, e.g., buy or sell a quantity/amount of a product at a specified price. Products, e.g., financial instruments, or order books representing the state of an electronic marketplace for a product, may be represented as data objects or data structures within the exchange computing system. The instructions may also be conditional, e.g., buy or sell a quantity of a product at a given value if a trade for the product is executed at some other reference value.

The exchange computing system may include one or more hardware matching processors that match, or attempt to match, the electronic data transaction request messages with other previously received, but not yet fully satisfied, electronic data transaction request messages counter thereto. Incoming electronic data transaction request messages may be received from different client computers over a data communication network and output electronic data transaction result messages, generated as a result of the processing of those incoming electronic data transaction request messages, may be transmitted to the client computers via that same, or a different, data communications network, and may be indicative of results of the attempts to match the incoming electronic data transaction request messages.

The specifically configured matching processors may additionally generate information indicative of a state of an environment (e.g., the state of the order book) based on the processing of the electronic data transaction request messages, and report this information to data recipient computing systems via outbound messages published via private or public data feeds that contain electronic data transaction result messages. While the disclosed embodiments may be described with respect to electronic data transaction request and result messages, it will be appreciated that the disclosed embodiments may be implemented with respect to other technologies or messaging mechanisms later developed.

For example, one exemplary environment where the disclosed embodiments may be desirable is in financial markets, and in particular, electronic financial exchanges, also referred to as electronic trading systems, such as the Chicago Mercantile Exchange Inc. (CME).

An electronic financial exchange provides one or more markets for the purchase and sale of various types of products including financial instruments such as stocks, bonds, futures contracts, options, currency, cash, swaps and other similar instruments. Agricultural products and commodities are also examples of products traded on such exchanges. A futures contract is a product that is a contract for the future delivery of a financial instrument such as a quantity of grains, metals, oils, bonds, currency, or cash settled against a rate. Generally, each exchange establishes a specification for each market provided thereby that defines at least the product traded in the market, minimum quantities that must be traded, and minimum changes in price (e.g., tick size). For some types of products (e.g., futures or options), the specification further defines a quantity of the underlying product represented by one unit (or lot) of the product, and delivery and expiration dates. For some types of products (e.g., variable commodities), the specification may further define variables, step sizes, premiums, or discounts for use in processing orders. As will be described, the exchange may further define the matching algorithm, or rules, by which incoming orders will be matched/allocated to resting orders.

Generally, as was described above, a market may involve market makers, such as market participants who consistently provide bids and/or offers at specific prices in a manner typically conducive to balancing risk, and market takers who may be willing to execute transactions at prevailing bids or offers or may be characterized by more aggressive actions so as to maintain risk and/or exposure as a speculative investment strategy. From an alternate perspective, a market maker may be considered a market participant who places an order to sell at a price at which there is no previously or concurrently provided counter order, i.e., an order that is likely to rest in the order book to await a suitable subsequently submitted counter order. A market taker may be considered a market participant who places an order to buy at a price at which there is a previously or concurrently provided counter order, i.e., an order that is likely to match with a currently resting order in the order book such as that placed by a market maker. A balanced and efficient market may involve both market makers and market takers, coexisting on a mutually beneficial basis. This mutual existence, when functioning properly, may facilitate liquidity in the market such that a market may exist with "tight" bid-ask spreads (e.g., small difference between bid (buy) and ask (sell) prices) and may also feature high volumes of executed transactions indicating that large quantity orders may be executed without driving prices significantly higher or lower.

A financial instrument trading system, such as a futures exchange, such as the Chicago Mercantile Exchange Inc. (CME), provides a contract market where financial instruments, e.g., futures and options on futures, are traded using electronic systems. "Futures" is a term used to designate contracts for the purchase or sale of financial instruments or physical commodities for future delivery or cash settlement on a commodity futures exchange. A futures contract is a legally binding agreement to buy or sell a commodity at a specified price at a predetermined future time. An option contract is the right, but not the obligation, to sell or buy the underlying instrument (in this case, a futures contract) at a specified price on or before a certain expiration date. An option contract offers an opportunity to take advantage of futures price moves without actually having a futures position. The commodity to be delivered in fulfillment of the contract, or alternatively the commodity for which the cash market price shall determine the final settlement price of the futures contract, is known as the contract's underlying reference or "underlier." The underlying or underlier for an options contract is the corresponding futures contract that is purchased or sold upon the exercise of the option.

Typically, the terms and conditions of each futures contract are standardized as to the specification of the contract's underlying reference commodity, the composition of the commodity, quantity, delivery date, and means of contract settlement. In embodiments described herein, terms and conditions of each futures contract may be partially standardized as to the specification of the contract's underlying reference commodity and attributes thereof. The underlying reference commodity may include a range of possible qualities, quantities, delivery dates, and other attributes. For a spot market transaction, the underlying quality and attributes may be set, while a futures contract may provide predetermined offsets to allow for possible settlement of a non-conforming delivery. Cash settlement is a method of settling a futures contract whereby the parties effect final settlement when the contract expires by paying/receiving the loss/gain related to the contract in cash, rather than by effecting physical sale and purchase of the underlying reference commodity at a price determined by the futures contract, price. Options and futures may be based on more generalized market indicators, such as stock indices, interest rates, futures contracts, and other derivatives.

An exchange may provide for a centralized "clearing house" through which trades made must be confirmed, matched, and settled each day until offset or delivered. The clearing house may be an adjunct to an exchange, and may be an operating division of an exchange, which is responsible for settling trading accounts, clearing trades, collecting and maintaining performance bond funds, regulating delivery, and reporting trading data. One of the roles of the clearing house is to mitigate credit risk. Clearing is the procedure through which the clearing house becomes buyer to each seller of a futures contract, and seller to each buyer, also referred to as a novation, and reduces risk of financial loss due to breach of contract by assuring performance on each contract. A clearing member is a firm qualified to clear trades through the clearing house.

An exchange computing system may operate under a central counterparty model, where the exchange acts as an intermediary between market participants for the transaction of financial instruments. In particular, the exchange computing system interposes itself into the transactions between the market participants, i.e., splits a given transaction between the parties into two separate transactions where the exchange computing system substitutes itself as the counterparty to each of the parties for that part of the transaction. In this way, the exchange computing system acts as a guarantor and central counterparty and there is no need for the market participants to disclose their identities to each other, or subject themselves to credit or other investigations by a potential counterparty. For example, the exchange computing system insulates one market participant from the default by another market participant. Market participants need only meet the requirements of the exchange computing system. Anonymity among the market participants encourages a more liquid market environment as there are lower barriers to participation. The exchange computing system can accordingly offer benefits such as centralized and anonymous matching and clearing.

A match engine, which may also be referred to herein as a module or match/matching engine processor, within an exchange trading system may comprise a transaction processing system that processes a high volume, e.g., millions, of messages or orders in one day. The messages are typically submitted from market participant computers. Exchange match engine systems may be subject to variable messaging loads due to variable market messaging activity. Performance of a match engine depends to a certain extent on the magnitude of the messaging load and the work needed to process that message at any given time. An exchange match engine may process large numbers of messages during times of high-volume messaging activity. With limited processing capacity, high messaging volumes may increase the response time or latency experienced by market participants.

Electronic messages such as incoming messages from market participants, i.e., "outright" messages, e.g., trade order messages, etc., are sent from client devices associated with market participants, or their representatives, to an electronic trading or market system.

Electronic trading of financial instruments, such as futures contracts, is conducted by market participants sending orders, such as to buy or sell one or more futures contracts, in electronic form to the exchange. These electronically submitted orders to buy and sell are then matched, if possible, by the exchange, i.e., by the exchange's matching engine, to execute a trade. Outstanding (unmatched, wholly unsatisfied/unfilled or partially satisfied/filled) orders are maintained in one or more data structures or databases referred to as "order books," such orders being referred to as "resting," and made visible, i.e., their availability for trading is advertised, to the market participants through electronic notifications/broadcasts, referred to as market data feeds. An order book is typically maintained for each product, e.g., instrument, traded on the electronic trading system and generally defines or otherwise represents the state of the market for that product, i.e., the current prices at which the market participants are willing to buy or sell various quantities of that product. As such, as used herein, an order book for a product may also be referred to as a market for that product.

Upon receipt of an incoming order to trade in a particular financial instrument, whether for a single-component financial instrument, e.g., a single futures contract, or for a multiple-component financial instrument, e.g., a combination contract such as a spread contract, a match/matching engine, as described herein, will attempt to identify a previously received but unsatisfied order counter thereto, i.e., for the opposite transaction (buy or sell) in the same financial instrument at the same or better price (but not necessarily for the same quantity unless, for example, either order specifies a condition that it must be entirely filled or not at all).

Previously received but unsatisfied orders, i.e., orders which either did not match with a counter order when they were received or their quantity was only partially satisfied, referred to as a partial fill, are maintained by the electronic trading system in an order book database/data structure to await the subsequent arrival of matching orders or the occurrence of other conditions which may cause the order to be modified or otherwise removed from the order book, e.g. an order cancelation message or order modification message.

If the matching engine identifies one or more suitable previously received but unsatisfied counter orders, they, and the incoming order, are matched to execute a trade therebetween to at least partially satisfy the quantities of one or both of the incoming order or the identified previously received orders. The identification of one or more suitable previously received but unsatisfied counter orders is performed according to a priority algorithm such as price/time, e.g., orders are identified as suitable based on their price and time of receipt, price/size/time, e.g., orders are identified as suitable based on their price, quantity and time of receipt, or other priority/matching algorithm known in the industry. If there remains any residual unsatisfied quantity of the identified one or more previously received orders, those orders are left on the order book with their remaining quantity to await a subsequent suitable counter order, i.e., to rest. If the matching engine does not identify a suitable previously received but unsatisfied counter order, or the one or more identified suitable previously received but unsatisfied counter orders are for a lesser quantity than the incoming order specifies, the incoming order is placed on the order book, referred to as "resting", with original or remaining unsatisfied quantity, to await a subsequently received suitable order counter thereto. Where more than one suitable previously received but unsatisfied counter order are identified as matching the incoming order but the combined quantity of the identified orders exceeds the quantity of the incoming order, one or more of the identified resting orders will not be completely satisfied by the incoming order. Accordingly, the matching engine may apply an allocation algorithm, such as price-time, pro rata, or a combination thereof, to determine the extent to which the quantity of each of the identified resting orders will be matched to satisfy the incoming order. The matching engine then generates match event data reflecting the result of this matching process. Other components of the electronic trading system, as will be described, then, based on this match event data, generate the respective order acknowledgment(s), e.g., private messages to let the particular market participants know what happened to their orders, and market data messages, e.g., public messages to let all market participants know what changed in the order book database, and transmit those messages to the market participants.

Matching, which is a function typically performed by the exchange, is a process, for a given order which specifies a desire to buy or sell a quantity of a particular instrument at a particular price, of seeking/identifying one or more wholly or partially, with respect to quantity, satisfying counter orders thereto, e.g., a sell counter to an order to buy, or vice versa, for the same instrument at the same, or sometimes better, price (but not necessarily the same quantity), which are then paired for execution to complete a trade between the respective market participants (via the exchange) and at least partially satisfy the desired quantity of one or both of the order and/or the counter order, with any residual unsatisfied quantity left to await another suitable counter order, referred to as "resting." As there is no guarantee that a suitable counter order will be identified, this process of searching the order book database and evaluating orders, etc., is often referred to as an "attempt" to match. A match event may occur, for example, when an aggressing order matches with a resting order. In one embodiment, two orders match because one order includes instructions for, or specifies buying a quantity of, an instrument at a price, and the other order includes instructions for, or specifies selling, a (different or same) quantity of the instrument at a same or better price. It should be appreciated that, as noted, performing an instruction associated with a message may include attempting to perform the instruction. Whether or not an exchange computing system is able to successfully perform an instruction may depend on the state of the electronic marketplace.

While the disclosed embodiments will be described with respect to a product by product or market by market implementation, e.g., implemented for each market/order book, it will be appreciated that the disclosed embodiments may be implemented so as to apply across markets for multiple products traded on one or more electronic trading systems, such as by monitoring an aggregate, correlated or other derivation of the relevant indicative parameters as described herein.

While the disclosed embodiments may be discussed in relation to futures and/or options on futures trading, it should be appreciated that the disclosed embodiments may be applicable to any equity, fixed income security, currency/foreign exchange (FX), commodity, swap, options or futures trading system or market, bilateral credit based or not, now available or later developed. It may be appreciated that a trading environment, such as a futures exchange as described herein, implements one or more economic markets where rights and obligations may be traded. As such, a trading environment may be characterized by a need to maintain market integrity, transparency, predictability, fair/equitable access, and participant expectations with respect thereto. In addition, it may be appreciated that electronic trading systems further impose additional expectations and demands by market participants as to transaction processing speed, latency, capacity, and response time, while creating additional complexities relating thereto. Accordingly, as will be described, the disclosed embodiments may further include functionality to ensure that the expectations of market participants are met, e.g., that transactional integrity and predictable system responses are maintained.

Financial instrument trading systems allow traders to submit orders and receive confirmations, market data, and other information electronically via electronic messages exchanged using a network. Electronic trading systems offer an efficient, fair and balanced market where market prices reflect a true consensus of the value of products traded among the market participants. Electronic marketplaces use electronic messages to communicate actions and related data of the electronic marketplace between market participants, clearing firms, clearing houses, and other parties. The messages can be received using an electronic trading system, wherein an action or transaction associated with the messages may be executed. For example, the message may contain information relating to an order to buy or sell a product in a particular electronic marketplace, and the action associated with the message may indicate that the order is to be placed in the electronic marketplace such that other orders which were previously placed may potentially be matched to the order of the received message. Thus, the electronic marketplace may conduct market activities through electronic systems.

As may be perceived/experienced by the market participants from outside the exchange or electronic trading system operated thereby, the following sequence describes how, at least in part, information may be propagated in such a system and how orders may be processed: (1) An opportunity is created at a matching engine of the exchange, such as by placing a recently received but unmatched order on the order book to rest; (2) The matching engine creates an update reflecting the opportunity and sends it to a feed engine; (3) The feed engine multicasts it to all of the market participants to advertise the opportunity to trade; (4) The market participants evaluate the opportunity and each, upon completion of their evaluation, may or may not choose to respond with an order responsive to the resting order, i.e., counter to the resting order; (5) The exchange gateway receives any counter orders generated by the market participants, sends confirmation of receipt back directly to each submitting market participant, and forwards the received orders to the matching engine; and (6) The matching engine evaluates the received orders and matches the first arriving order against the resting opportunity and a trade is executed.

As used herein, a financial message, or an electronic message, refers both to messages communicated by market participants to an electronic trading or market system and vice versa. The messages may be communicated using packets or other techniques operable to communicate information between systems and system components. Some messages may be associated with actions to be taken in the electronic trading or market system.

Financial messages communicated to the electronic trading system, also referred to as "inbound" messages, may include associated actions that characterize the messages, such as trader orders, order modifications, order cancellations and the like, as well as other message types. Inbound messages may be sent from client devices associated with market participants, or their representatives, e.g., trade order messages, etc., to an electronic trading or market system. For example, a market participant may submit an electronic message to the electronic trading system that includes an associated specific action, e.g. order to trade, to be undertaken by the electronic trading system, such as entering a new trade order into the market or modifying or canceling an existing order in the market. In one embodiment, if a participant wishes to modify a previously sent request, e.g., a prior order which has not yet been processed or traded, they may send a request message comprising a request to modify the prior request. In one exemplary embodiment, the incoming request itself, e.g., the inbound order entry, may be referred to as an iLink message. iLink is a bidirectional communications/message protocol/message format implemented by the Chicago Mercantile Exchange Inc. As used herein, the terms/phrases order, order message, trade order message, electronic trade order message, electronic data transaction request or data transaction request may be used interchangeably to refer to requests, and/or electronic data indicative thereof, electronically sent/communicated to, communicated among components thereof, and/or processed by, an electronic trading system and/or matching engine thereof as described herein to place and/or process orders to trade financial instruments or modify or cancel such orders, etc.

Financial messages communicated from the electronic trading system, referred to as "outbound" messages, may include messages responsive to inbound messages, such as confirmation messages, or other messages such as market update messages, quote messages, and the like. Outbound messages, or electronic data transaction result messages, may be disseminated via data feeds.

Financial messages may further be categorized as having or reflecting an impact on a market or electronic marketplace, also referred to as an "order book" or "book," for a traded product, such as a prevailing price therefore, number of resting orders at various price levels and quantities thereof, etc., or not having or reflecting an impact on a market or a subset or portion thereof. In one embodiment, an electronic order book may be understood to be an electronic collection of the outstanding or resting orders for a financial instrument.

For example, a request to place a trade may result in a response indicative of the trade either being matched with, or being rested on an order book to await, a suitable counter-order. This response may include a message directed solely to the trader who submitted the order to acknowledge receipt of the order and report whether it was matched, and the extent thereto, or rested. The response may further include a message to all market participants reporting a change in the order book due to the order, or an electronic data transaction result message. This response may take the form of a report of the specific change to the order book, e.g., an order for quantity X at price Y was added to the book (referred to, in one embodiment, as a Market By Order message), or may simply report the result, e.g., price level Y now has orders for a total quantity of Z (where Z is the sum of the previous resting quantity plus quantity X of the new order). In some cases, requests may elicit a non-impacting response, such as temporally proximate to the receipt of the request, and then cause a separate market-impact reflecting response at a later time. For example, a stop order, fill or kill order (FOK), also known as an immediate or cancel order, or other conditional request may not have an immediate market impacting effect, if at all, until the requisite conditions are met.

An acknowledgement or confirmation of receipt, e.g., a non-market impacting communication, may be sent to the trader simply confirming that the order was received. Upon the conditions being met and a market impacting result thereof occurring, a market-impacting message may be transmitted as described herein both directly back to the submitting market participant and to all market participants (in a Market by Price "MBP", or Market by Order "MBO"). It should be appreciated that additional conditions may be specified, such as a time or price limit, which may cause the order to be dropped or otherwise canceled and that such an event may result in another non-market-impacting communication instead. In some implementations, market impacting communications may be communicated separately from non-market impacting communications, such as via a separate communications channel or feed.

For additional details and descriptions of different market data feeds, see U.S. Patent Publication No. 2017/0331774, filed on May 16, 2016, entitled "Systems and Methods for Consolidating Multiple Feed Data", assigned to the assignee of the present application, the entirety of which is incorporated by reference herein and relied upon.

It should be further appreciated that various types of market data feeds may be provided which reflect different markets or aspects thereof. Examples of the various types of market data feeds which may be provided by electronic trading systems, such as the CME, in order to provide different types or subsets of market information or to provide such information in different formats include Market By Order, Market Depth (also known as Market by Price to a designated depth of the book), e.g., CME offers a 10-deep market by price feed, Top of Book (a single depth Market by Price feed), and combinations thereof. There may also be all manner of specialized feeds in terms of the content, i.e., providing, for example, derived data, such as a calculated index.

Many types of electronic trading systems exist, using different trading models. Examples include RFQ (Request for Quote) based systems, anonymous matching systems and auction based systems. An example of anonymous matching system is disclosed in U.S. Pat. No. 6,996,541 Togher et al, the content of which is incorporated herein by reference. Togher describes a distributed matching system in which traders connected to the system through a communications network submit orders into the system to buy or sell financial instruments. Maker orders are displayed to other traders on the system who can respond to those orders with their own orders which will be matched with the visible maker orders in accordance with matching rules to execute a trade. Typically, the system will receive maker orders from all parties and construct an order book based, for example, an order price and time of order receipt. For ease of interpretation only the best order or best few orders will be displayed to other traders on their screens and counterparty traders respond to the best orders they see.

Many trading systems, such as the electronic trading system provided by the Chicago Mercantile Exchange Inc., are based on a centralized host computer, or, alternatively, multiple distributed host computers, which matches incoming maker and taker orders, maintains order books and administers credit limits. Generally, when an incoming order is received, the trading system accesses a database, referred to as an orderbook, containing data indicative of resting, i.e. previously received but not yet fully satisfied or canceled, orders. If a suitable order counter to the incoming order is found in the order book, a match is made and the two orders are traded. The state of the orderbook, i.e. the current set of resting orders, is provided to market participants via a market data feed which conveys data indicative of the order book state and/or changes thereto, i.e. to advertise to the market participants those orders that are currently available to trade.

As was described above, a market maker, also referred to as a passive trader, is generally a trader who places an order at a price at which there are no presently resting orders, i.e. an order that the trade knows will not match with a currently resting order and therefore will itself be placed in the orderbook as a resting order, also referred to as a passive order, and, via the market data feed, be advertised to the other traders. A market taker, also referred to as an aggressor or aggressive trader, is generally a trader who places an order that they know is counter to currently resting order with the goal of matching and trading against that resting order. In some trading systems, market takers may outnumber market makers by 20 to 1 or more. In some trading systems, the operators of the trading system may provide incentives to encourage traders to be market makers.

The host computer also may be responsible for distributing market related data, generating deal tickets or other confirmation messages after a trade has been executed and maintaining records of activity on the system. Some trading systems, such as that described in Togher et al mentioned above, may operate as a distributed model in which the matching engine is split into, or otherwise replicated among, a number of separate matching engines. This approach may be attractive in a global trading system where latency issues can have an impact on access to a centralized system from different parts of the world. The Togher et al distributed system, as implemented by ICAP Plc in its EBS trading platform, has a number of matching engines each located geographically in a main financial market. As these markets operate at different times of the day, many of the trades will be between parties who are operating in the same geographical region and the matching may be performed locally at the regional matching engine. Other trades may involve two separate matching engines in two separate geographical regions. An example would be a trade conducted in the afternoon in London between a London based trader and a New York based trader where it is the morning and the markets are open.

In the embodiments illustrated in the Figures, the electronic trading system is an electronic brokerage system for facilitating the buying and selling of financial instruments such as foreign exchange (FX) spot products or precious metals, equities, futures and/or options contracts. Although the present technology may be described in the context of FX Spot and metals trading, the invention is not linked to the trading of any particular financial instrument and is applicable to trading of any financial instrument via a centralized or distributed electronic trading system including, but not limited to, foreign exchange products, precious metals, equities, derivatives such as futures contracts, options contracts (including options on futures), swaps, forward, as well as commodities, cash instruments, securities, long and short term debt and repurchase agreements.

Moreover, the technology is not limited to the trading of financial or non-financial products and is applicable to any system in which the relative time of access to a computer system is important. The technology of the present application will be described with relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

The system to be described is an anonymous trading system. Again, the technology and disclosure is not limited to any particular system architecture and may be used with a host based system such as that of U.S. Pat. No. 7,461,026 or any other system architecture, including systems with a centralized matching engine or where the matching functionality is replicated and/or split among multiple distributed matching engines. An anonymous system is one in which the identity of the parties to a trade is not known to the participants, at least, in some implementations, until a trade has been agreed. The invention may also be used in systems which are completely anonymous or not anonymous.

In particular, the disclosed embodiments may be used with systems, such as the Togher et al system referred to above, and the system described herein, where firm orders are submitted for execution and these orders will be dealt unless the order fails to meet one of a number of predetermined criteria such as the availability of sufficient credit for the trade at one of the potential parties to the trader. Alternatively, the disclosed embodiments may be used with central counterparty based electronic trading systems, such as the CME system referred to above, where the electronic trading system guarantees performance of the transacting parties, i.e. margin is used to obviate the need for a bilateral credit relationship. Accordingly, the disclosed embodiments are not limited to systems submitting firm orders for execution and may be used with any other order entry system including systems which operate on the basis of RFQs or in which matches are negotiated following an initial identification of a possible match.

Example implementations of the present technology provide advantages over previous latency mechanisms. In certain embodiments, the technology may provide one or more of the following features or other improvements: in contrast to prior latency floor mechanisms which impart a delay on all, or a subset of, orders when they are received, e.g. buffers them in a batch/window prior to determining whether they will match with a previously received order, and then sends the buffered orders, e.g. randomly, to the match engine/CLOB, the disclosed embodiments remove the fastest taker advantage, while imparting zero added latency between order submission/modifications/cancellations and price market data publication by the trading system, because the disclosed randomization processing delay applies only to matched orders, which represent a small fraction (such as approximately 0.5%) of the market events, i.e. if an order fails to match it is not delayed; elimination of "quote sniping" by fast takers, e.g. traders attempting to trade against a previously received but yet unsatisfied (resting) order, and tightening of bid-offer spreads by prioritizing and/or randomizing order cancellations; and removal of the fastest maker advantage by randomization of execution or priority of passive orders.

In one example embodiment, the above advantages are achieved by performing randomization of orders at the matching time, i.e. upon the determination of a match, rather than at the message input time. The latency penalty is applied only when a match occurs. Because only a small fraction (such as less than 1%) of orders included in order messages result in a match, randomization of orders at the matching time eliminates nearly all latency consequences of order randomization.

Generally, as orders are received, they are immediately, without any additional delay, forwarded to the match engine to determine if a suitable resting, i.e. previously received but not yet fully satisfied or canceled, order is in the order book database. If no match is found, the incoming order is itself placed/stored, i.e. rested, in the order book database, and advertised, e.g., via a market data message, to the market, to await a subsequent suitable incoming order or cancellation. However, if a suitable resting counterorder is identified, the incoming order and the identified resting order are placed in a pending-matched state, referred to as "engaged." This engagement period may last for a defined period of time, such as 1, 2 or 4 milliseconds.

During the engagement period, if a cancellation of the resting order is received, in one embodiment, the resting order will be cancelled and the incoming order, in one embodiment, is processed against the remaining orders on the order book to find another match or is otherwise rested on the book. Alternatively, the incoming order may be rejected. In an alternative embodiment, a cancellation of the resting order received during the engagement period may be subject to randomized contest, subject to a defined probability which may be varied by the system, to determine if the cancellation will be successful or not. In one embodiment, if the cancellation is unsuccessful, subsequent attempts to cancel will be rejected, i.e., the resting order will be rendered un-cancelable. During the engagement period, if a subsequent incoming order is received which also matches with the identified resting order, the system may randomly, subject to a defined probability which may be varied by the system, determine which of the two incoming orders will be allowed to trade with the identified resting order. Once the engagement period ends, assuming the resting order was not canceled, the surviving engaged incoming order is matched with the resting order and a trade is confirmed.

As was described above, an incoming order may be for the same, a greater or a lesser quantity than is available from the one or more suitable counter orders currently resting in the order book database. Where the incoming and available quantities differ, the engagement described above may be limited to the overlapping quantity only, e.g. where there is excess available quantity from the resting orders, that quantity may remain "unengaged" and available to match with another incoming order. It may be useful to consider, for the purpose of matching, an incoming order for a given quantity to be processed as an equivalent quantity of single unit orders with identical price time priority, each being processed as described herein. Similarly, while a single cancel instruction is typically received for an entire prior order quantity, partial cancels (or order modifications) where only a partial quantity is canceled may be supported. Accordingly, cancel or modify transactions may also be considered as a quantity of unit transactions. In one embodiment, however, when a randomized contest between transactions is undertaken, a single contest may apply to the entire subject quantity of the given competing transactions. Alternatively, each unit of quantity may be subject to its own randomized contest.

As can be seen, the selectivity of the disclosed embodiments requires less processing resources as the disclosed mechanisms are only implicated when a match occurs and, furthermore, only need arbitrate among competing orders when such orders are received during the engagement period.

In one embodiment, the identified resting order(s) may be removed from the order book, and a suitable market data message noting the change sent to the market participants, upon entering the engagement period. Alternatively, the resting order(s) may only be removed once the engagement period ends and a trade is confirmed. It will be appreciated that once another market participant learns of the engagement of a previously resting order, they may attempt to submit a subsequent matching order before the end of the engagement period in order to attempt to supplant the engaged incoming order. In one embodiment, this action may not be discouraged. In an alternate embodiment, these market data messages may be delayed just long enough to guarantee another market participant will not have sufficient time to submit a competing order.

In one embodiment, upon entering the engagement period, the traders associated with incoming and resting orders may be notified of the engagement. In one embodiment, the notification may specify the engagement but not identify the counter parties. In an alternative embodiment, the counter parties may be identified to each other, e.g. such that bilateral credit checks may be performed.

Where an incoming order's engagement with a resting order is supplanted by a subsequently received incoming order, the prior incoming order may receive preferential treatment with respect to another matching resting order, e.g. the trade may be immediately confirmed with no engagement period or the engagement period may allow for cancellation of the other resting order but not supplanting of the incoming order by yet another subsequently received incoming order. Alternatively, a supplanted aggressive order may be given no further advantage over other orders or automatically canceled.

In one embodiment, the randomization function for the engagement period, as to incoming cancelations and/or incoming competing transactions, may be statically or variably weighted, such as temporally, e.g. as the engagement time period elapses/nears termination, the probability that a later received incoming order can supplant the engaged incoming order decreases, e.g., linearly, non-linearly, exponentially, step-wise or event based. Such weightings may be implementation dependent and, for example, may be determined based on the latency between when an order book update message is broadcast to the market participants, or estimated to be received thereby, and when a response to that order book update may be reasonably expected to be received by the electronic trading system.

It will be appreciated that the operational parameters of the disclosed embodiments, e.g. the length of engagement window, probability of a later received order supplanting an earlier engaged order, probability of a later received cancellation successfully canceling an engaged resting order, weighting values thereof, etc. may be implementation dependent, and may depend, for example, on the degree to which the electronic trading system wishes to protect market makers. The probability of a later order supplanting an earlier order, or a later cancellation being successful, may range from 0, i.e. it will never happen, to 100%, i.e. it will always happen. In one embodiment, the electronic trading system may offer a trade order transaction type which permits a market maker to specify one or more of these parameters in their trade order, e.g. they may specify the length of the engagement window and thereby, for example, control how long they have to cancel an engaged order. Such parameters may further include the degree to which the incoming order matches the identified counter order, e.g. in terms of quantity and/or price, and how a subsequently received order at a better price and/or quantity should be treated when received during the engagement period. For example, if the incoming order is for a price that is close but exactly the asking price of the resting order, and/or for a different quantity, a subsequently received order, received during the engagement period, for a better/closer price and/or quantity may automatically supplant the engaged order or at least alter/bias the weighting of the random selection. For example, complete fills may be preferred over partial fills, etc.

The embodiments may be described in terms of a distributed computing system. The examples identify a specific set of components useful in a futures and options exchange. However, many of the components and inventive features are readily adapted to other electronic trading environments. The specific examples described herein may teach specific protocols and/or interfaces, although it should be understood that the principles involved may be extended to, or applied in, other protocols and interfaces.

It should be appreciated that the plurality of entities utilizing or involved with the disclosed embodiments, e.g., the market participants, may be referred to by other nomenclature reflecting the role that the particular entity is performing with respect to the disclosed embodiments and that a given entity may perform more than one role depending upon the implementation and the nature of the particular transaction being undertaken, as well as the entity's contractual and/or legal relationship with another market participant and/or the exchange.

An exemplary trading network environment for implementing trading systems and methods is shown in FIG. 1. An exchange computer system 100 receives messages that include orders and transmits market data related to orders and trades to users, such as via wide area network 162 and/or local area network 160 and computer devices 114, 150, 152, 154, and 156, as described herein, coupled with the exchange computer system 100.

Herein, the phrase "coupled with" is defined to mean directly connected to or indirectly connected through one or more intermediate components. Such intermediate components may include both hardware- and software-based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions hereinbefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

Figure 2:
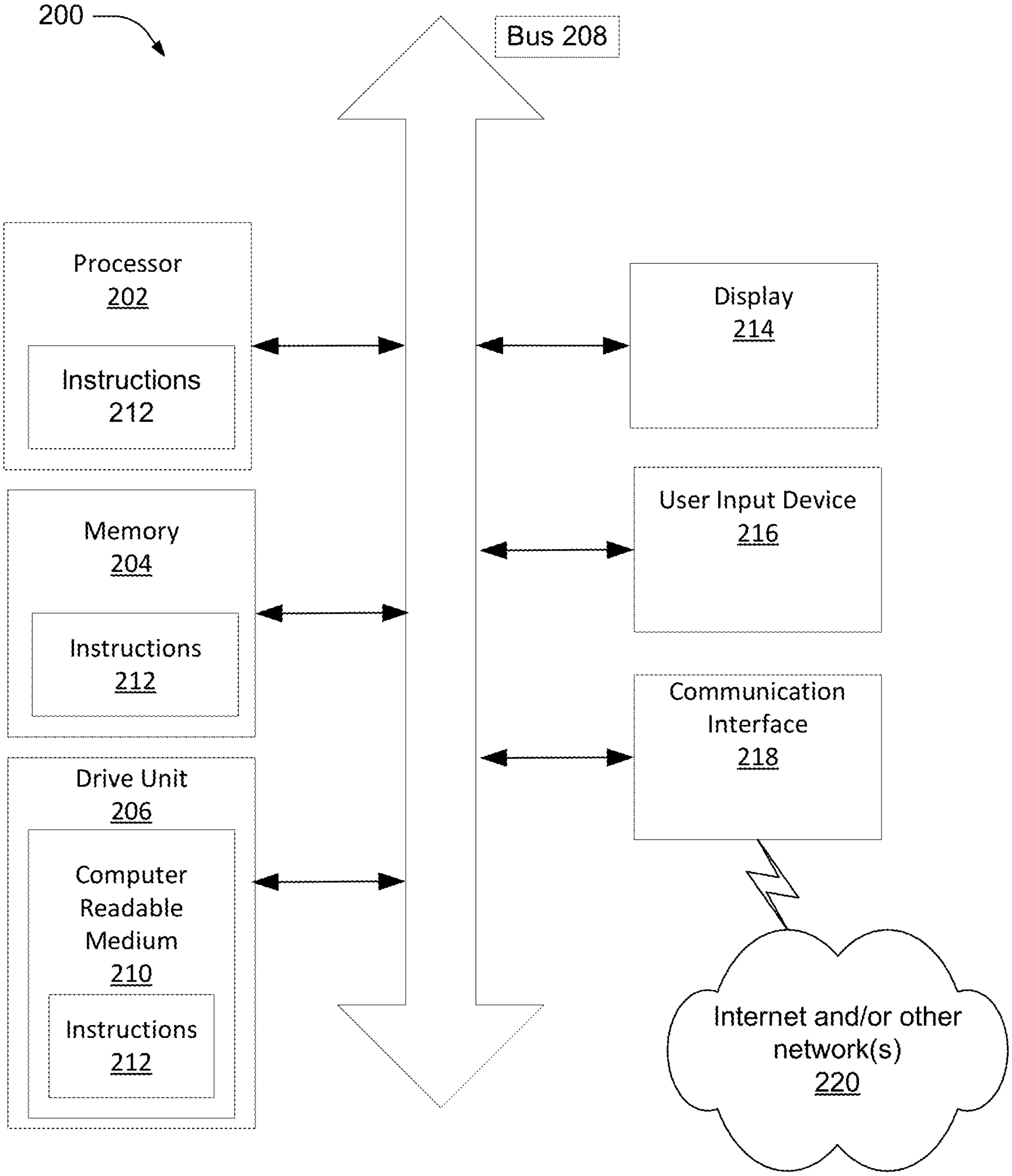
FIG. 2 depicts a general computer system, according to some embodiments.

The exchange computer system 100 may be implemented with one or more mainframes, desktops, or other computers, such as the example computer 200 described herein with respect to FIG. 2. A user database 102 may be provided which includes information identifying traders and other users of exchange computer system 100, such as account numbers or identifiers, usernames, and passwords. An account data module 104 may be provided which may process account information that may be used during trades. The account data module 104 may store relationship information for the participants of the exchange. For example, the account data module 104 may store credit relationship data that defines credit relationships between participants. The account data module 104 may store data that defines which participants other participants are willing to trade with or otherwise complete contracts. Certain participants, for example, may wish to avoid trading with a competitor or otherwise unwelcome trading partner. Certain participants may be denied the opportunity to trade with other participants due to regulatory actions or legal reasons.

A match, or matching, engine module 106 may be included to match bid and offer prices and may be implemented with software that executes one or more algorithms for matching bids and offers. A trade database 108 may be included to store information identifying trades and descriptions of trades. Trade database 108 may store information identifying the time that a trade took place and the contract price.

An order book module 110 may be included to compute or otherwise determine current bid and offer prices, e.g., in a continuous auction market, or also operate as an order accumulation buffer for a batch auction market.

A market data module 112 may be included to collect market data and prepare the data for transmission to users. For example, the market data module 112 may prepare the market data feeds described herein.

A risk management module 134 may be included to compute and determine a user's risk utilization in relation to the user's defined risk thresholds. The risk management module 134 may also be configured to determine risk assessments or exposure levels in connection with positions held by a market participant. The risk management module 134 may be configured to administer, manage, or maintain one or more margining mechanisms implemented by the exchange computer system 100. Such administration, management or maintenance may include managing database records reflective of margin accounts of the market participants. In some embodiments, the risk management module 134 implements one or more aspects of the disclosed embodiments, including, for instance, principal component analysis (PCA) based margining, in connection with interest rate swap (IRS) portfolios, as described herein.

A latency leveling module/processor 136 may be included to implement the disclosed maker-maker, maker-taker and taker-taker race mitigation mechanisms. Alternatively, this functionality may be integrated with the match engine module 106.

As an intermediary to electronic trading transactions, the exchange bears a certain amount of risk in each transaction that takes place. To that end, the clearing house implements risk management mechanisms to protect the exchange. One or more of the modules of the exchange computer system 100 may be configured to determine settlement prices for constituent contracts, such as deferred month contracts, of spread instruments, such as for example, settlement management module 140. A settlement management module 140 (or settlement processor or other payment processor) may be included to provide one or more functions related to settling or otherwise administering transactions cleared by the exchange. Settlement management module 140 of the exchange computer system 100 may implement one or more settlement price determination techniques. Settlement-related functions need not be limited to actions or events occurring at the end of a contract term. For instance, in some embodiments, settlement-related functions may include or involve daily or other mark to market settlements for margining purposes. In some cases, the settlement management module 140 may be configured to communicate with the trade database 108 (or the memory(ies) in which the trade database 108 is stored) and/or to determine a payment amount based on a spot price, the price of the futures contract or other financial instrument, or other price data, at various times. The determination may be made at one or more points in time during the term of the financial instrument in connection with a margining mechanism. For example, the settlement management module 140 may be used to determine a mark to market amount on a daily basis during the term of the financial instrument. Such determinations may also be made on a settlement date for the financial instrument for the purposes of final settlement.

In some embodiments, the settlement management module 140 may be integrated to any desired extent with one or more of the other modules or processors of the exchange computer system 100. For example, the settlement management module 140 and the risk management module 134 may be integrated to any desired extent. In some cases, one or more margining procedures or other aspects of the margining mechanism(s) may be implemented by the settlement management module 140.

One or more of the above-described modules of the exchange computer system 100 may be used to gather or obtain data to support the settlement price determination, as well as a subsequent margin requirement determination. For example, the order book module 110 and/or the market data module 112 may be used to receive, access, or otherwise obtain market data, such as bid-offer values of orders currently on the order books. The trade database 108 may be used to receive, access, or otherwise obtain trade data indicative of the prices and volumes of trades that were recently executed in a number of markets. In some cases, transaction data (and/or bid/ask data) may be gathered or obtained from open outcry pits (where traders, or their representatives, all physically stand in a designated location, i.e., a trading pit, and trade with each other via oral and visual/hand based communication) and/or other sources and incorporated into the trade and market data from the electronic trading system(s). It should be appreciated that concurrent processing limits may be defined by or imposed separately or in combination on one or more of the trading system components.

The disclosed mechanisms may be implemented at any logical and/or physical point(s), or combinations thereof, at which the relevant information/data (e.g., message traffic and responses thereto) may be monitored or flows or is otherwise accessible or measurable, including one or more gateway devices, modems, the computers or terminals of one or more market participants, e.g., client computers, etc.

One skilled in the art will appreciate that one or more modules described herein may be implemented using, among other things, a tangible computer-readable medium comprising computer-executable instructions (e.g., executable software code). Alternatively, modules may be implemented as software code, firmware code, specifically configured hardware or processors, and/or a combination of the aforementioned. For example, the modules may be embodied as part of an exchange computer system 100 for financial instruments. It should be appreciated that the disclosed embodiments may be implemented as a different or separate module of the exchange computer system 100, or a separate computer system coupled with the exchange computer system 100 to have access to margin account record, pricing, and/or other data. As described herein, the disclosed embodiments may be implemented as a centrally accessible system or as a distributed system, e.g., where some of the disclosed functions are performed by the computer systems of the market participants.

The trading network environment shown in FIG. 1 includes exemplary computer devices 150, 152, 154, and 156 which depict different exemplary methods or media by which a computer device may be coupled with the exchange computer system 100 or by which a user may communicate, e.g., send and receive, trade or other information therewith. It should be appreciated that the types of computer devices deployed by traders and the methods and media by which they communicate with the exchange computer system 100 is implementation dependent and may vary and that not all of the depicted computer devices and/or means/media of communication may be used and that other computer devices and/or means/media of communications, now available or later developed may be used. Each computer device, which may comprise a computer 200 described in more detail with respect to FIG. 2, may include a central processor, specifically configured or otherwise, that controls the overall operation of the computer and a system bus that connects the central processor to one or more conventional components, such as a network card or modem. Each computer device may also include a variety of interface units and drives for reading and writing data or files and communicating with other computer devices and with the exchange computer system 100. Depending on the type of computer device, a user can interact with the computer with a keyboard, pointing device, microphone, pen device or other input device now available or later developed.

An exemplary computer device 150 is shown directly connected to exchange computer system 100 via a network 162, such as via a T1 line, a common local area network (LAN) or other wired and/or wireless medium for connecting computer devices, such as the network 220 shown in FIG. 2 and described with respect thereto. Another exemplary computer device 114 is further shown connected to a radio 132. The user of radio 132, which may include a cellular telephone, smart phone, or other wireless proprietary and/or non-proprietary device, may be a trader or exchange employee. The radio user may transmit orders or other information to the exemplary computer device 114 or a user thereof. The user of the exemplary computer device 114, or the exemplary computer device 150 alone and/or autonomously, may then transmit the trade or other information to the exchange computer system 100.

Exemplary computer devices 152 and 154 are coupled with a local area network ("LAN") 160 which may be configured in one or more of the well-known LAN topologies, e.g., star, daisy chain, etc., and may use a variety of different protocols, such as Ethernet, TCP/IP, etc. The exemplary computer devices 152 and 154 may communicate with each other and with other computer and other devices which are coupled with the LAN 160. Computer and other devices may be coupled with the LAN 160 via twisted pair wires, coaxial cable, fiber optics or other wired or wireless media. As shown in FIG. 1, an exemplary wireless personal digital assistant device ("PDA") 156, such as a mobile telephone, tablet-based computer device, or other wireless device, may communicate with the LAN 160 and/or the Internet 162 via radio waves, such as via Wi-Fi, Bluetooth® and/or a cellular telephone-based data communications protocol. PDA 156 may also communicate with exchange computer system 100 via a conventional wireless hub 128.

FIG. 1 also shows the LAN 160 coupled with a wide area network ("WAN") 162 which may be comprised of one or more public or private wired or wireless networks. In one embodiment, the WAN 162 includes the Internet 162. The LAN 160 may include a router to connect LAN 160 to the Internet 162. Exemplary computer device 154 is shown coupled directly to the Internet 162, such as via a modem, DSL line, satellite dish or any other device for connecting a computer device to the Internet 162 via a service provider therefore as is known. LAN 160 and/or WAN 162 may be the same as the network 220 shown in FIG. 2 and described with respect thereto.

Users of the exchange computer system 100 may include one or more market makers 130 which may maintain a market by providing constant bid and offer prices for a derivative or security to the exchange computer system 100, such as via one of the exemplary computer devices depicted. The exchange computer system 100 may also exchange information with other match or trade engines, such as trade engine 138. One skilled in the art will appreciate that numerous additional computers and systems may be coupled to exchange computer system 100. Such computers and systems may include clearing, regulatory and fee systems.

The operations of computer devices and systems shown in FIG. 1 may be controlled by computer-executable instructions stored on a non-transitory computer-readable medium. For example, the exemplary computer device 152 may store computer-executable instructions for receiving order information from a user, transmitting that order information to exchange computer system 100 in electronic messages, extracting the order information from the electronic messages, executing actions relating to the messages, and/or calculating values from characteristics of the extracted order to facilitate matching orders and executing trades. In another example, the exemplary computer device 150 may include computer-executable instructions for receiving market data from exchange computer system 100 and displaying that information to a user.

Numerous additional servers, computers, handheld devices, personal digital assistants, telephones, and other devices may also be connected to exchange computer system 100. Moreover, one skilled in the art will appreciate that the topology shown in FIG. 1 is merely an example and that the components shown in FIG. 1 may include other components not shown and be connected by numerous alternative topologies.

Referring now to FIG. 2, an illustrative embodiment of a general computer system 200 is shown. The computer system 200 can include a set of instructions that can be executed to cause the computer system 200 to perform any one or more of the methods or computer-based functions disclosed herein. The computer system 200 may operate as a standalone device or may be connected, e.g., using a network, to other computer systems or peripheral devices. Any of the components discussed herein, such as processor 202, may be a computer system 200 or a component in the computer system 200. The computer system 200 may be specifically configured to implement a match engine, margin processing, payment or clearing function on behalf of an exchange, such as the Chicago Mercantile Exchange Inc., of which the disclosed embodiments are a component thereof.

In a networked deployment, the computer system 200 may operate in the capacity of a server or as a client user computer in a client-server user network environment, or as a peer computer system in a peer-to-peer (or distributed) network environment. The computer system 200 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In an embodiment, the computer system 200 can be implemented using electronic devices that provide voice, video, or data communication. Further, while a single computer system 200 is illustrated, the term "system" shall also be taken to include any collection of systems or sub-systems that individually or jointly execute a set, or multiple sets, of instructions to perform one or more computer functions.

As illustrated in FIG. 2, the computer system 200 may include a processor 202, e.g., a central processing unit (CPU), a graphics processing unit (GPU), or both. The processor 202 may be a component in a variety of systems. For example, the processor 202 may be part of a standard personal computer or a workstation. The processor 202 may be one or more general processors, digital signal processors, specifically configured processors, application specific integrated circuits, field programmable gate arrays, servers, networks, digital circuits, analog circuits, combinations thereof, or other now known or later developed devices for analyzing and processing data. The processor 202 may implement a software program, such as code generated manually (i.e., programmed).

The computer system 200 may include a memory 204 that can communicate via a bus 208. The memory 204 may be a main memory, a static memory, or a dynamic memory. The memory 204 may include, but is not limited to, computer-readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 204 includes a cache or random-access memory for the processor 202. In alternative embodiments, the memory 204 is separate from the processor 202, such as a cache memory of a processor, the system memory, or other memory. The memory 204 may be an external storage device or database for storing data. Examples include a hard drive, compact disc ("CD"), digital video disc ("DVD"), memory card, memory stick, floppy disk, universal serial bus ("USB") memory device, or any other device operative to store data. The memory 204 is operable to store instructions executable by the processor 202. The functions, acts or tasks illustrated in the figures or described herein may be performed by the programmed processor 202 executing the instructions 212 stored in the memory 204. The functions, acts or tasks are independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing and the like.

As shown, the computer system 200 may further include a display unit 214, such as a liquid crystal display (LCD), an organic light emitting diode (OLED), a flat panel display, a solid-state display, a cathode ray tube (CRT), a projector, a printer or other now known or later developed display device for outputting determined information. The display 214 may act as an interface for the user to see the functioning of the processor 202, or specifically as an interface with the software stored in the memory 204 or in the drive unit 206.

Additionally, the computer system 200 may include an input device 216 configured to allow a user to interact with any of the components of system 200. The input device 216 may be a number pad, a keyboard, or a cursor control device, such as a mouse, or a joystick, touch screen display, remote control, or any other device operative to interact with the system 200.

In an embodiment, as depicted in FIG. 2, the computer system 200 may also include a disk or optical drive unit 206. The disk drive unit 206 may include a computer-readable medium 210 in which one or more sets of instructions 212, e.g., software, can be embedded. Further, the instructions 212 may embody one or more of the methods or logic as described herein. In an embodiment, the instructions 212 may reside completely, or at least partially, within the memory 204 and/or within the processor 202 during execution by the computer system 200. The memory 204 and the processor 202 also may include computer-readable media as discussed herein.

The present disclosure contemplates a computer-readable medium that includes instructions 212 or receives and executes instructions 212 responsive to a propagated signal, so that a device connected to a network 220 can communicate voice, video, audio, images, or any other data over the network 220. Further, the instructions 212 may be transmitted or received over the network 220 via a communication interface 218. The communication interface 218 may be a part of the processor 202 or may be a separate component. The communication interface 218 may be created in software or may be a physical connection in hardware. The communication interface 218 is configured to connect with a network 220, external media, the display 214, or any other components in system 200, or combinations thereof. The connection with the network 220 may be a physical connection, such as a wired Ethernet connection or may be established wirelessly. Likewise, the additional connections with other components of the system 200 may be physical connections or may be established wirelessly.

The network 220 may include wired networks, wireless networks, or combinations thereof. The wireless network may be a cellular telephone network, an 802.11, 802.16, 802.20, or WiMAX network. Further, the network 220 may be a public network, such as the Internet, a private network, such as an intranet, or combinations thereof, and may utilize a variety of networking protocols now available or later developed including, but not limited to, TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. While the computer-readable medium is shown to be a single medium, the term "computer-readable medium" includes a single medium or multiple medium, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein. The computer-readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated or otherwise specifically configured hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

Although the present specification describes components and functions that may be implemented in some embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical discs, or optical discs. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical discs; and CD ROM and DVD-ROM discs. The processor and the memory can be supplemented by, or incorporated in, special purpose logic circuitry.

As used herein, the terms “microprocessor” or “general-purpose processor” (“GPP”) may refer to a hardware device that fetches instructions and data from a memory or storage device and executes those instructions (for example, an Intel Xeon processor or an AMD Opteron processor) to then, for example, process the data in accordance therewith. The term “reconfigurable logic” may refer to any logic technology whose form and function can be significantly altered (i.e., reconfigured) in the field post-manufacture as opposed to a microprocessor, whose function can change post-manufacture, e.g., via computer executable software code, but whose form, e.g., the arrangement/layout and interconnection of logical structures, is fixed at manufacture. The term “software” may refer to data processing functionality that is deployed on a GPP. The term “firmware” may refer to data processing functionality that is deployed on reconfigurable logic. One example of a reconfigurable logic is a field programmable gate array (“FPGA”) which is a reconfigurable integrated circuit. An FPGA may contain programmable logic components called “logic blocks”, and a hierarchy of reconfigurable interconnects that allow the blocks to be “wired together”, somewhat like many (changeable) logic gates that can be inter-wired in (many) different configurations. Logic blocks may be configured to perform complex combinatorial functions, or merely simple logic gates like AND, OR, NOT and XOR. An FPGA may further include memory elements, which may be simple flip-flops or more complete blocks of memory.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well. Feedback provided to the user can be any form of sensory feedback, e.g., visual feedback, auditory feedback, or tactile feedback. Input from the user can be received in any form, including acoustic, speech, or tactile input.

Embodiments of the subject matter described in this specification can be implemented in a computing system that includes a back-end component, e.g., a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (“LAN”) and a wide area network (“WAN”), e.g., the Internet.

The computing system can include clients and servers. A client and server are generally remote from each other and typically interact through a communication network. The relationship of client and server arises by virtue of computer programs running on the respective computers and having a client-server relationship to each other.

It should be appreciated that the disclosed embodiments may be applicable to other types of messages depending upon the implementation. Further, the messages may comprise one or more data packets, datagrams or other collection of data formatted, arranged configured and/or packaged in a particular one or more protocols, e.g., the FIX protocol, TCP/IP, Ethernet, etc., suitable for transmission via a network 214 as was described, such as the message format and/or protocols described in U.S. Pat. No. 7,831,491 and U.S. Patent Publication No. 2005/0096999 A1, both of which are incorporated by reference herein in their entireties and relied upon. Further, the disclosed message management system may be implemented using an open message standard implementation, such as FIX, FIX Binary, FIX/FAST, or by an exchange-provided API.

According to one embodiment, a latency leveling module or processor 136 as may be implemented as a separate component of the exchange computer system 100, and coupled with the match engine module 106, or integrated with another module thereof, such as the match engine module 106.

The latency leveling processor 136 may be implemented by a processor and a memory, such as the processor 202, memory 204 described in detail above with reference to FIG. 2, where in the memory is operative to store computer executable instructions, such as in the form of one or more logic components, that when executed by the processor, cause the processor to operate as described herein. Alternatively, the computer executable instructions or logic components described herein may be implemented as one or more separate components, such as on an FPGA which may include a memory or reconfigurable component to store logic and a processing component to execute the stored logic.

In one embodiment, the latency leveling processor 136 is coupled with the matching engine 106 of the exchange computer system of the electronic trading system, wherein, as described above, the matching engine 106 includes an order book database in which previously received but not fully satisfied data transaction requests, e.g. orders to trade, are stored based, at least in part, on time of receipt relative to each other, e.g. time or price time priority. The latency leveling processor 136 is operative, e.g. the stored computer executable instructions are operative to cause the processor, for each of a plurality of incoming data transaction requests processed by the matching engine, each data transaction request message comprising one of an order for a quantity or a cancel of a previously received data transaction request, to: determine the transaction type of the incoming data transaction request.

Where the processor determines, such as based on data provided by the matching engine 106. that the transaction type comprises an order for a quantity, it may first be determined whether at least one previously received but unsatisfied data transaction request, e.g. at least one resting order, counter to the incoming data transaction request was identified in the order book database by the matching engine.

Where it is determined that at least one previously received but unsatisfied data transaction request counter to the incoming data transaction request was identified in the order book database by the matching engine, it may be further determined, where a total quantity of at least two of the identified at least one previously received but unsatisfied data transaction requests received within a configurable first threshold period time, also referred to herein as a contest delay, of each other exceeds the quantity of the incoming data transaction request, referred to herein as a maker-maker race, based on a first function, e.g. based on a probability/randomization function, also referred to herein as a delayed contest probability, whether to cause the matching engine to process the at least two identified at least one previously received but unsatisfied data transaction requests in a sequence in which they were received or to cause the matching engine to process the at least two identified at least one previously received but unsatisfied data transaction requests in a sequence other than in which they were received;

It will be appreciated that, when the available quantity of suitable resting counter orders meets or exceeds the quantity of the incoming order, the matching engine 106 is able to match all of those resting orders and need not choose from among them, e.g. by applying a priority algorithm such as price time, pro rata, etc. Furthermore, if the available quantity of suitable resting counter orders is less than the quantity of the incoming order and the times of receipt of those resting counter orders are sufficiently spread out, e.g. the difference between the receipt times of any two of the resting counter orders is greater than the contest delay, the matching engine 106 may apply its priority algorithm to choose which of the resting orders will be used to fulfill the incoming order based on the receipt times thereof.

The probability/randomization may apply a static or dynamic, e.g. temporally dynamic, e.g. decaying, probability function, as a function of the elapse of the contest delay time period, as described elsewhere herein.

For each identified at least one previously received but unsatisfied data transaction request selected, e.g., based on the quantity of the incoming order, the total quantity available and the price-time priority of the suitable counter orders as may be modified as described above (or alternatively, below) by the matching engine 106 to match with the incoming data transaction request, determine whether the identified at least one previously received but unsatisfied data transaction request was previously identified by the matching engine as being counter to a previously received incoming data transaction request received within a threshold period of time of the incoming data transaction request (and thus "engaged" as described herein).

It will be appreciated that, in one embodiment, if a resting order was engaged but its engagement period has expired or it was canceled as described below, it would have been traded and/or removed from the order book database and therefore would not have been identified as a suitable counter order to the present incoming order. Accordingly, the set of identified at least one previously received but unsatisfied data transaction requests may only include those not engaged and/or those engaged and still within their engagement window.

Accordingly, only where it is determined that the identified at least one previously received but unsatisfied data transaction request is "engaged," i.e., was previously identified by the matching engine as being counter to a previously received incoming data transaction request received within a configurable second threshold period of time, referred to as a taker-taker race, also referred to herein as an engagement delay, of a time of receipt of the incoming data transaction request, i.e. the engagement delay has not yet expired, determine, based on a second function, e.g. based on a probability/randomization function, also referred to herein as a delayed engagement probability (DEP), whether to replace the previously received incoming data transaction request with the incoming transaction request, and based thereon, one of cause the matching engine to replace the previously received incoming data transaction request with the incoming transaction request or not cause the matching engine to replace the previously received incoming data transaction request with the incoming transaction request. As noted elsewhere, the replacement of a prior order with a current order may be only to the extent of the quantities thereof where the quantity of the incoming and prior orders differ.

In one embodiment where the prior incoming order is not, or not entirely, replaced, the incoming order, or remaining quantity thereof, may be re-matched with other suitable engaged or not engaged orders according to described process, may be treated as unmatched and rested on the order book or may be rejected. In one embodiment, where the prior order is replaced, in whole or in part, the supplanted order, or remaining quantity thereof, may be re-matched with other suitable engaged or not engaged orders according to described process, may be treated as unmatched and rested on the order book or may be rejected. In one embodiment, where the prior order is replaced, the engagement delay may be reset. Alternatively, the engagement delay may be immediately terminated or allowed to continue for the remainder thereof.

The probability/randomization may apply a static or dynamic, e.g. temporally dynamic, e.g. decaying, probability function, as a function of the elapse of the engagement delay time period, as described elsewhere herein.

Where it is determined that the identified at least one previously received but unsatisfied data transaction request was not previously identified by the matching engine as being counter to a previously received incoming data transaction request, delaying completion of the matching by the matching processor of the incoming data transaction request with the identified at least one previously received but unsatisfied data transaction request for the first threshold period of time, i.e. engaging the incoming order with the identified at least one previously received but unsatisfied data transaction request for the engagement period. In one embodiment, data indicative of the engagement, including the time of initiation, remaining engagement delay, etc. may be stored in the order book database in association with the data indicative of the engaged transactions. Alternatively, the data indicative of the engagement may be stored in a separate memory and/or data structure. In one embodiment, the engaged identified at least one previously received but unsatisfied data transaction request is removed from the order book database and data indicative thereof is transmitted to the market participants as described elsewhere herein. Alternatively, data indicative of the removal is not transmitted until after a delay period, e.g. until after the engagement period has expired. Where the data indicative of a change to the order book is transmitted prior to expiration of the engagement period, a subsequently received aggressor order which, may have been transmitted by a trader after learning of the engagement and which might replace the engaged incoming order, as described herein, may be treated differently, e.g. the probability of successful replacement may be reduced or otherwise, eliminated to prevent such an order from supplanting the engaged order.

Where it is determined that the transaction type comprises a cancel (or modification) of a previously received data transaction request, the latency leveling processor 136 may determine whether the previously received data transaction request is stored in the order book database and has been identified as being counter to a previously received incoming data transaction request, i.e. is resting and unengaged or is engaged and within the engagement window, referred to as a maker-taker race. It will be appreciated that if previously received order which is the subject of the cancel request is not found in the order book database, it may be because it was already traded (matched and its engagement period expired) or it was previously canceled. While the transaction is referred to as cancel transaction, it may otherwise comprise a request to modify a previously received order, such as to alter the quantity thereof. Requests to modify may be treated the same as requests to cancel as described herein. A request to modify which reduces the quantity of an order to zero may be considered a request to cancel that order.

Accordingly, only where the previously received data transaction request is stored in the order book database and has been identified as being counter to a previously received incoming data transaction request within the first threshold period of time of the delay of the completion of the match of the previously received data transaction request with the previously received incoming data transaction request, i.e. it is still within its engagement window, the latency leveling processor 136 determines, based on a third function, e.g. based on a probability/randomization function, also referred to herein as an engagement interrupt probability (EIP), whether to cancel (or modify) the previously received data transaction request and, based thereon, one of cause the matching engine to cancel/modify the previously received data transaction request or cause the matching engine not to cancel/modify the previously received data transaction request.

If it is determined that the previously received data transaction request will not be canceled/modified, data indicative of such, e.g., a flag, may be associated with the previously received data transaction request indicative of the result. This flag may indicate that the previously received data transaction request is not un-cancelable or unmodifiable by a subsequently received cancel/modify request. Alternatively, the probability of a cancel/modify being successful may decay/degrade over the time of the engagement window such that later received cancel/modify requests are less likely to succeed. Such mechanisms may discourage a trader from submitting multiple requests to cancel/modify in the hope of increasing the chances they will succeed.

Where the previously received data transaction request is stored in the order book database and has not been identified as being counter to a previously received incoming data transaction request, cause the matching engine 106 to remove the previously received data transaction request from the order book database.

In the situation of a maker-maker, rather than determining priority among two or more closely received suitable resting counter orders at the time of matching an incoming order, as described, above, the latency leveling processor 136 may instead make such a determination at the time a passive order, i.e. an order which does not match a resting order, is received such that the incoming order is stored/rested in the order book database in the determined priority which will be later used by the matching engine 106 to match that order against a subsequently received incoming order. Note that this will not add delay to the incoming passive order. It will simply alter the priority or sequence in which it is stored in the order book database relative to other previously stored orders.

In particular, where it is determined that at least one previously received but unsatisfied data transaction request counter to the incoming data transaction request was not identified in the order book database by the matching engine, i.e. no match for the incoming order was identified, the latency leveling processor may determine whether at least one previously received data transaction request, received within a configurable first threshold period time, also referred to herein as a contest delay, of the incoming data transaction request, is stored in the order book database for which the matching engine would identify a same, e.g. based on a same price, at least one previously received but unsatisfied data transaction request counter thereto as would be identified for the incoming data transaction request. If no such at least one previously received data transaction request exists in the order book, the incoming order simply stored as usual according to its time priority.

Where it is determined that at least one previously received data transaction request, received within the second threshold period time of the incoming data transaction request, is stored in the order book database for which the matching engine would identify a same at least one previously received but unsatisfied data transaction request counter thereto as would be identified for the incoming data transaction request, determine, based on a function, which may be the same as the first function described above, e.g., based a delayed contest probability, whether to store the incoming order in the order book database in manner based on other than time of receipt of the incoming order relative to the determined at least one previously received data transaction request, e.g. by adding time to the time of receipt of the determined at least one previously received data transaction request to make it appear as if it were received later than it actually was, and based thereon, one of cause the matching engine to store the incoming data transaction request in the order book database in manner based on other than time of receipt of the incoming order relative to the determined at least one previously received data transaction request or cause the matching engine to store the incoming data transaction request in the order book database in manner based on the time of receipt of the incoming order relative to the determined at least one previously received data transaction request. It will be appreciated that to alter the time priority of a given data transaction request, the disclosed embodiments may alter the data indicative of the time of receipt to make it appear as if the data transaction request arrived earlier or later that its actual time of receipt and/or store the data transaction request in the order book database, along with the others of the previously received data transaction requests, in an arrangement which is indicative of the determined priority/times of receipt.

Figure 3:
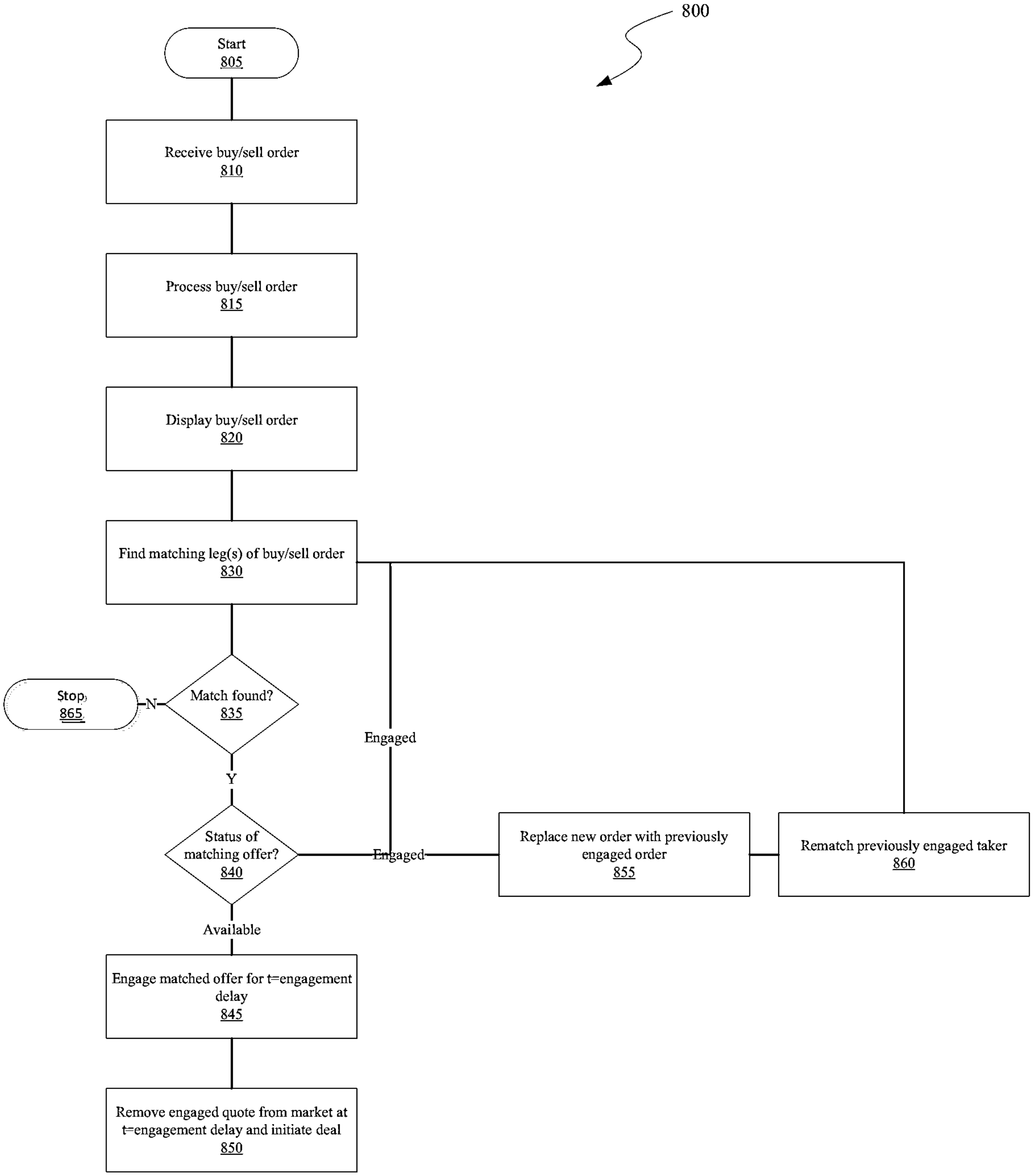
FIG. 3 illustrates an overview of an example embodiment of a process of the present invention.
Figure 4:
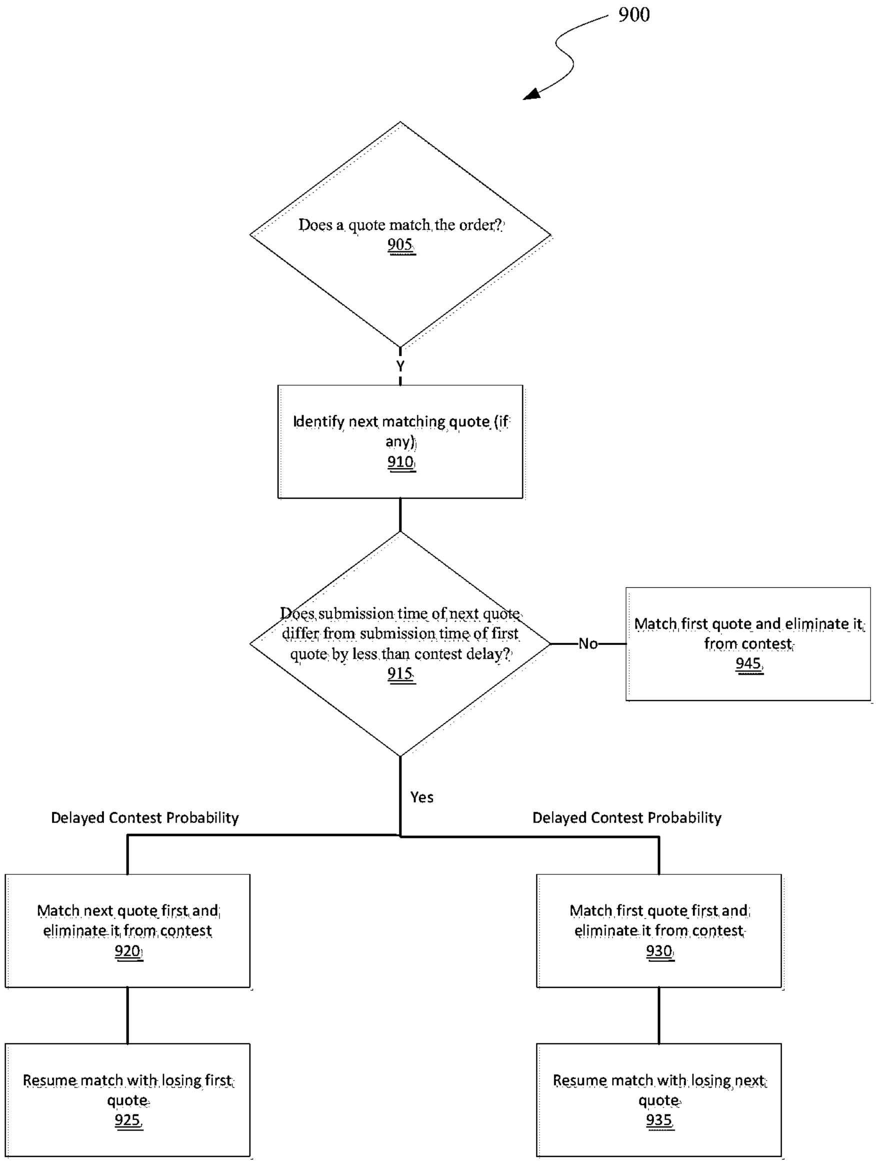
FIG. 4 illustrates the steps performed in some implementations when searching for a match at a given price level.
Figure 5:
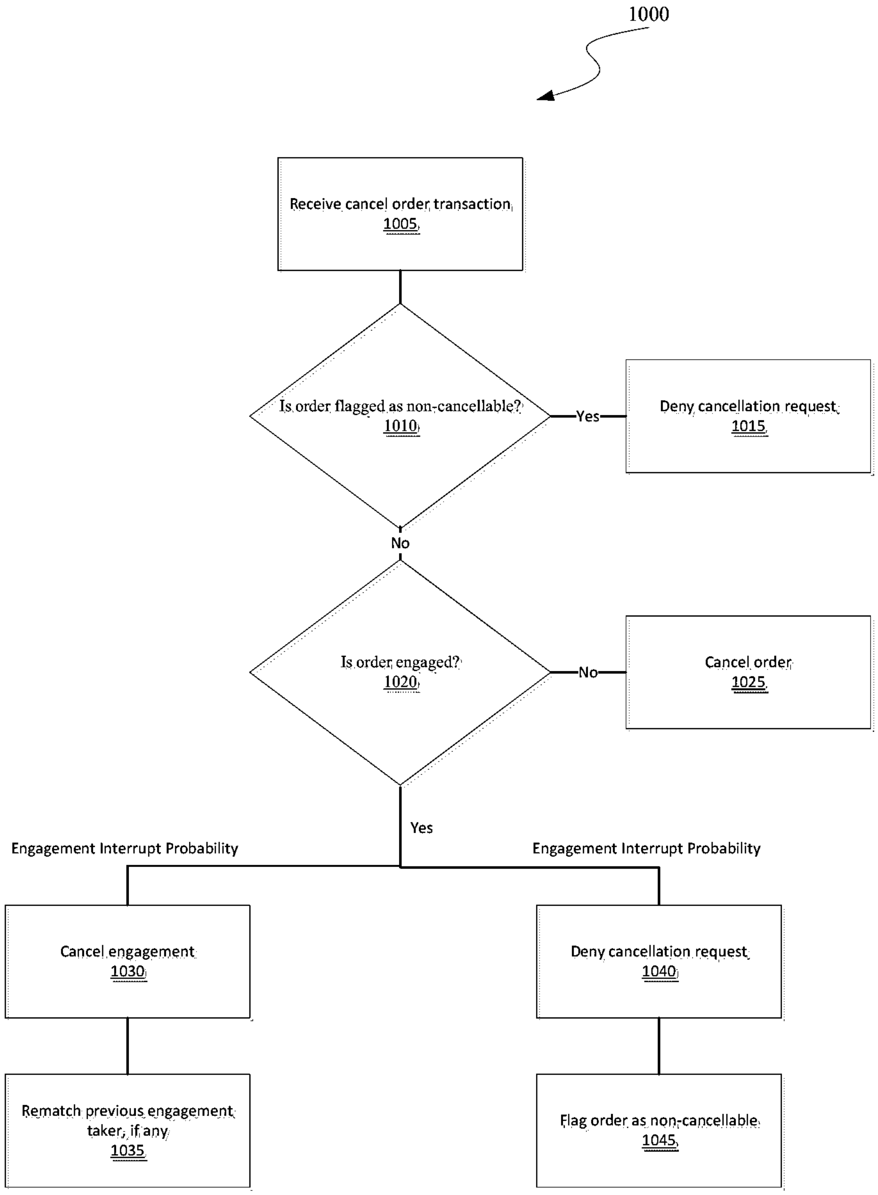
FIG. 5 illustrates the steps performed in some implementations when an order cancellation request is received.

FIGS. 3-5 depict operation of the system of latency leveling processor 136 of FIG. 1 according to one embodiment and illustrate the way in which the handling of incoming orders is changed to minimize the impact, at least with respect to latency of the system and/or speed of the operating systems. The figures illustrate how orders are received, e.g. from the trader devices 150-156, and processed by match engine module 106. In essence, orders are randomized at matching time rather than at message input time, i.e. randomization is only selectively applied to orders identified as matching and not affecting orders which do not match. The latency penalty is applied only when a match occurs. Because a small fraction (such as less than 1%) of orders included in order messages result in a match, the improvement eliminates nearly all latency consequences of order randomization (about 99.99% improvement—assuming about 100 low-latency market data consumers).

FIG. 3 illustrates an overview of an example embodiment of the operation of the disclosed embodiments which, for example, may be implemented by the latency leveling module 136 and/or match engine module 106 described above. While described as a series of discrete operations, certain of the operations may be performed in parallel and/or consolidated into a single operation and other single operations may be separated into multiple separate operations. In this illustrative methodology, the process 800 begins at Block 805 and proceeds to Block 810, where, over a trading system or platform, one or more electronic order messages, each comprising an order for trading an instrument, are received, e.g. via the network 162. An order can be a buy order to purchase an instrument, or a sale order to sell an instrument. The order can comprise one or more of the following information: instrument name, instrument type (contract, currency, stock, fund, etc.), price (bid/ask/stop, etc.), date of order, quantity, ticker, order type, trade conditions (e.g., average price trade, cash trade, distribution, automatic execution, etc.), etc. An order can be an aggressive order or a passive order as was described above. An aggressive order is one that removes liquidity posted to the books. Usually an aggressive order crosses the bid-ask spread. For example, an aggressive buy order will usually be priced on the offer or higher, and an aggressive sell order will be priced on the bid or lower. An aggressive order is usually matched and executed assuming enough quantity is available/posted on the books to fill the order. A passive order, on the other hand, is one placed at price at which there is no resting counter order and will sit on the books and has no guarantee of being matched and/or transacted. An order may transact in part aggressively and in part passively as well if the aggressive order is for a larger quantity than is presently resting on the order book, referred to as a partial fill. That is, the order will be partially filled, removing liquidity, and the remaining unsatisfied quantity will be rested on the order book to await a subsequent suitable counter transaction, thereby adding liquidity.

The received order can be processed, at Block 815, to, for example, determine order specific information such as originating party information (e.g., trader information), order specific information (e.g., buy/sell, bid price/ask price, trade instrument, order receipt date/time, etc.), market information (e.g., current price, trade volume, market volatility, etc.). In one embodiment, the received orders may be displayed to the market, at Block 820, with minimal (and in some instances zero) system imposed delay, e.g. market data messages and/or confirmation messages representative of the received orders may be transmitted to the client devices of the market participants with minimal system delay. For example, after an order is received and processed, its information can be transmitted to a trader workstation 150 such that it can be displayed to a manual trader using a user interface provided by the workstation.

Process 800 can then, at Block 830, find any matches that exist for the received and processed order against the offers in the system, i.e., the resting/previously received but not fully satisfied counter orders stored in the order book database. The received and processed orders can be matched in price priority (e.g., in decreasing order of price). Alternatively, or in addition thereto, other matching priority algorithms may be used including price/time, pro-rata or combinations thereof. An aggressive order can be matched against all available or "engaged" offers/quotes. An offer/quote is considered to be in an "engaged" status if it has been previously matched with another order and is currently awaiting initiation of the deal (between the offer/quote and the previously matched order) or, otherwise, completion of the match or trade. This concept will become clearer from the following description. Passive orders can be considered to be essentially equal in time priority if their entry times differ very slightly, up to, for example, a contest delay (e.g., few hundreds or thousands of microseconds). Contest delay can be a predetermined amount of time (e.g., a few hundreds or thousands of microseconds), or can be determined dynamically (e.g., based on currency pair, maker and taker attributes, inter-order delays involved, locality of orders, market conditions, volatility, volume of trades, price fluctuations, or other implementation dependent factors, etc.).

For each price level, process 800 can match all available or engaged offers/quotes in availability-time priority, where availability places available quotes ahead of engaged quotes. FIG. 4 illustrates the operations performed in some implementations when searching for a match at a given price level. Process 900 determines, at Block 905 if an offer/quote matches an aggressive order. If a match is found, process 900, at Block 910, identifies a next matching offer/quote (if any). If a next matching offer/quote is identified, at Block 915, process 900 determines if the next offer/quote's submission time differs from the first quote's submission time by less than a threshold amount of time (contest delay) (e.g., few hundreds or thousands of microseconds). If the next offer/quote's submission time differs from the first offer/quote's submission time by less than the contest delay time, the process 900 selects one of two outcomes based on a delayed contest probability. Delayed contest probability can start at around 50% and decrease as a function of the difference between the submission times of the two offers/quotes. The value of delayed contest probability can be a predetermined value (e.g., 50%), or can be determined dynamically (e.g., based on currency pair, maker and taker attributes, inter-order delays involved, locality of orders, market conditions, volatility, volume of trades, price fluctuations, or other implementation dependent factors, etc.). Based on the delayed contest probability, as the first outcome, process 900 can match the next offer/quote first and eliminate it from the contest, at Block 920. Process 900 can then resume the matching process with the losing first offer/quote. As the second outcome, process 900 can match the first offer/quote first and eliminate it from the contest, at Block 930. Process 900 can then resume the matching process with the next offer/quote. If the next offer/quote's submission time differs from the first quote's submission time by more than a threshold amount, the first offer/quote is matched and eliminated from the contest, at Block 940. The process 900 can then resume the matching process with the next offer/quote.

In some implementations, a random submission time delay (e.g., up to Contest Delay) can be added at the time when a passive order is received for matching. The random submission time delay may not constitute a processing delay, but instead may simply change the order queue insertion point for the new passive order. In this manner, process 800 can define a static priority of the passive order which does not change the likelihood of being matched first during the lifetime of the passive order.

Coming back to FIG. 3, when a match is not found at Block 835, the process ends at Block 865. On the other hand, if a match is found at Block 835, process 800 determines the status of the matched offer/quote at Block 840. If the status of the matched offer/quote is available, at Block 845, process 800 marks the matched offer/quote and order pair as "engaged" and imposes an engagement delay. An offer/quote can be maintained in an "engaged" status for a time period that equals a maximum of engagement delay microseconds. In this manner, while process 800 does not initiate the deal, or otherwise complete the trade/transaction/match, between the order and the matched offer/quote for a time period equal to an engagement delay, it marks the status of each as engaged to designate that a match has been found and a deal/trade/transaction, or otherwise, completion of the matching process, may be initiated between the matched order and offer/quote pair. Engagement delay can be a predetermined amount of time (e.g., a few hundreds or thousands of microseconds), or can be determined dynamically (e.g., based on currency pair, maker and taker attributes, inter-order delays involved, locality of orders, market conditions, volatility, volume of trades, price fluctuations, or other implementation dependent factor, etc.). In some implementations, engagement delay can be the same as contest delay. Engagement delay provides retroactive cancel (negative cancel latency), e.g., because it extends the window of opportunity for a trader, e.g., maker, to cancel their trade beyond when a match therewith is identified. This can facilitate elimination of quote sniping by fast takers and can tighten bid-offer spreads.

After the engagement delay time period elapses, at Block 850, process 800 removes the engaged quote from the market and initiates a deal between the currently matched order and offer/quote pair. On the other hand, of the status of the matched offer/quote is engaged, at Block 855, process 800 selects one of two outcomes based on a delayed engagement probability. Delayed engagement probability can start at around 50% and decrease as a function of engagement time. The value of delayed engagement probability can be a predetermined value (e.g., 50%), or can be determined dynamically (e.g., based on currency pair, maker and taker attributes, inter-order delays involved, locality of orders, market conditions, volatility, volume of trades, price fluctuations, or other implementation dependent factor, etc.). Based on the delayed engagement probability, as a first outcome, at Block 855, the new order (i.e., the order that is currently being matched) replaces the order that was previously engaged in the engaged match. The previously engaged order can then be re-matched at Block 860. As the second outcome, process 900 can continue the search for a matching offer/quote.

FIG. 5 illustrates the steps performed in some implementations when an order cancellation request is received. At Block 1005, process 1000 receives a request to cancel all or part of an order. At Block 1010, process 1000 determines if the order is flagged as non-cancellable. If the order (or part of the order) is flagged as non-cancellable, at Block 1015, process 1000 denies the cancel request in its entirety or only as to the non-cancelable portion. However, if the order is not flagged as non-cancellable, at Block 1020, process 1000 determines if the order is engaged (i.e., if the status of order is set to engaged). If the status of the order is not engaged, at Block 1025, process 1000 can cancel the order (or part of the order). On the other hand, if the status of the order is set as engaged, process 1000 selects one of two outcomes based on an engagement interrupt probability. Engagement interrupt probability can start at around 50% and decrease as a function of the engagement time. The value of engagement interrupt probability can be a predetermined value (e.g., 50%), or can be determined dynamically (e.g., based on currency pair, maker and taker attributes, inter-order delays involved, locality of orders, market conditions, volatility, volume of trades, price fluctuations, or other implementation dependent factor, etc.). In some implementations, delayed engagement probability, engagement interrupt probability, and delayed contest probability are initialized and decay according to the same formula. Based on the engagement interrupt probability, as the first outcome, at Block 1030, process 1000 can cancel the engagement between the order and an offer/quote. Process 1000 can then rematch any orders that were previously engaged with the offer/quote. As the second outcome, process 1000 can, at Block 1040 deny the cancellation request and, at Block 1045, flag the order as non-cancellable.

In Summary

Terminology

- Available quantity/amount of a resting (maker) order is the portion of the portion of the quantity/amount of the resting order that is not engaged in a match with an aggressive (taker) order, i.e. where the aggressive order is for a lesser quantity than the resting order.
- Freely Engaged (FE) quantity/amount of a maker order is the portion of the quantity/amount of the resting order that has been non-exclusively engaged with a taker order, i.e. the filled quantity of the taker order. The quantity/amount may be fully or partially re-engaged with a later taker order, or cancelled when the maker order is successfully cancelled.
- Exclusively Engaged (XE) amount of a maker order is the portion of the quantity/amount of the resting order that has been exclusively engaged with a taker order. The exclusively engaged quantity/amount may be cancelled when the maker order is successfully cancelled, but it cannot get re-matched with a later taker order.
- Engagement quantity/amount of a maker order is the sum of the Freely Engaged quantity/amount and the Exclusively Engaged quantity/amount.
- Matchable quantity/amount of a maker order is the sum of the Available quantity/amount and the Freely Engaged quantity/amount.

The disclosed embodiments may replace prior Latency Floor mechanisms with a technical system/algorithm that satisfies the following objectives:

- Zero added latency between order submission/modification/cancellation and price market data publication by the match engine(s). (Randomization processing delay applies only to matched orders=0.5% of the market events).

Prioritize order cancellations to eliminate “quote sniping” by fast takers and tighten bid-offer spreads.

Randomize execution of aggressive orders to remove the fastest taker advantage.

Randomize execution of passive orders to remove the fastest maker advantage.

The disclosed embodiments may avoid:

Significant delays (e.g., up to 5 ms) which are introduced in the order processing and the resulting market data (as measured from the order message submission time by the customer) by prior latency floor mechanisms.

Fake liquidity phenomena:

New liquidity (new bids/offers) is unnecessarily hidden from the market because of the latency floor window delay.

Removed liquidity (cancelled or dealt quotes) is unnecessarily maintained in the market because of the latency floor window delay.

Phantom bids/offers are published when the latency floor batch is published and quotes that are matched in the same batch are shown in the (streaming) market data.

Batching of incoming orders/order messages for submission to the match engine(s) resulting in unnatural bursts of market data emitted by the match engine(s).

Further, batch processing decreases the efficiency of the match engine(s) and adds additional latency (over and above the latency floor window).

The side effects listed above are largely masked by the existing time-sliced and/or slow market data, but may become increasingly visible as the latency of the publication of market data messages is decreased, e.g., to 10 ms or less.

The disclosed embodiments perform randomization of orders at matching time rather than at message input time. The latency penalty (the Engagement Delay defined below) is applied only when a match occurs. Since less than 1% of orders/order messages result in a match, the improvement eliminates nearly all latency consequences of order randomization (about 99.99% improvement-assuming about 100 low-latency market data consumers).

In one embodiment, there is no Latency Floor window delay. The pre-processing latency floor window is zero (all orders/order messages are routed directly to the matching engine(s) (or Matching Thread thereof). No message batching occurs—all orders/order messages are processed as soon as they arrive.

Engagement Delay—randomizing the taker race. In one embodiment, when two orders (from a maker and a taker) are matched, the trade/transaction/deal “proposal” goes on a (5 ms for a local deal) “honeymoon” or “engagement period” that, for bilateral credit based trading systems, may entail a visit to the Broker on each side to verify and reserve credit. (This honeymoon trip may be eliminated by the introduction of a credit agent inside the trading system. But the non-trivial ability to process a “pending deal” may be already built-in and is helpful in implementing the new algorithm.)

In one embodiment, before a deal is initiated (by, for example, sending the HitNotify message to the maker or querying the credit agent) an Engagement Delay may be inserted (few hundreds or thousands of microseconds). Using the honeymoon analogy, maker and taker get “engaged” for (maximum of) engagement delay microseconds.

The engagement rules, in one embodiment:

When an aggressive order (buy or bid) is processed, it is matched against all available or engaged offers in the price-time contest order (see the next section). If the offer is available, an engagement takes place. If the offer is engaged, we use a random selection process to select two outcomes with defined Delayed Engagement Probability (DEP) (think of DEP starting at around 50% and decreasing during the engagement):

The new taker replaces the previously engaged taker who may be re-matched.

Nothing happens—the search for a matching offer continues (see the next section).

If a cancel (QteInterrupt) arrives during the engagement period, a random selection process is used to select two outcomes with defined Engagement Interrupt Probability (EIP) (think of EIP starting at around 50% and decreasing during the engagement):

The engagement is terminated, the previously engaged taker is re-matched, the cancel request is accepted; or Nothing happens. The maker’s order is flagged as non-cancellable, the cancel request is denied.

The engaged quote amount is removed from the market at the end of the engagement period or when the quote is successfully cancelled—same as is done today at deal initiation or when quote is cancelled.

Price-Time Contest—randomizing the maker race. In one embodiment, the matching may be done in strict price-time order (after the batch shuffle done in the Latency Floor batch mechanism). The matching rules may be modified to consider passive orders to be essentially equal in time priority if their entry times differ very slightly, up to a Contest Delay (think of contest delay being the same or close to the typical engagement delay).

In one embodiment of the price-time contest rules:

When an aggressive order is received, we attempt to match the aggressor to all matching available or engaged quotes in price priority.

For each price level, we match all available or engaged quotes in availability-time priority, where availability places available quotes ahead of engaged quotes.

When searching for a match at a given price level: If a quote matches the aggressive order, we consider the next matching quote (if any) and if the next quote’s submission time differs from the first quote’s submission time by less than contest delay, a random selection process is used to select two outcomes with defined Delayed Contest Probability (think of DCP starting at around 50% and decreasing with the difference between the submission times).

The next quote is matched first and is eliminated from the contest; matching resumes with the loosing first quote; or The first quote is matched first and is eliminated from the contest; matching resumes with the next quote.

Randomizing the maker race—alternative (simple) solution: There are several other methods to randomize the maker race, the simplest one of them consisting of adding a random submission time delay (up to Contest Delay) at the time when a passive order is received by the matching engine. Note that this does not constitute a processing delay—this simply changes the order queue insertion point for the new passive order. The main difference from the previous solution is that this method defines a static priority of the passive order which does not change the likelihood of being matched first during the lifetime of the passive order.

Order cancel prioritization: Engagement delay provides retroactive cancel (negative cancel latency). This may be considered essential to eliminate “quote sniping” by fast takers and is expected to tighten bid-offer spreads.

The algorithm may allow for a number of adjustable parameters:

Engagement delay (ED microseconds), delayed engagement probability (DEP %) and engagement interrupt probability (EIP %).

Contest delay (CD microseconds) and delayed contest probability (DCP %)

All five parameters may be adjustable. They may depend on currency pair, maker and taker attributes, inter-order delays involved, locality of orders, etc. The fewer "dials," the better—from comprehension, design, coding, and testing perspectives.

In one embodiment, the Ultra latency floor algorithm is simplified:

Engagement delay=Contest delay.

DEP, EIP, and DCP are initialized and decay according to the same formula.

Efficiency: The disclosed embodiments may be as efficient and deterministic as needed. As an example, the previously engaged taker that loses an engagement dice toss, would be re-matched against available quotes only as shown in FIGS. 13 and 14 described below.

Price-time ordering: Using the disclosed embodiments, the queue of passive orders is maintained in strict price/submission-time order. This may maintain the long-standing market convention (and EBS system's rues). The deviations from price-time matching are introduced only at the matching time, encapsulated in the order matching software module.

Deployment: The disclosed randomized latency floor mechanism could be carefully introduced by gradually decreasing an existing Latency Floor window of a latency floor mechanism which delays/batches all incoming transactions while at the same time increasing the appropriate Latency Floor values of the disclosed embodiments. This would provide a graceful transition from a system which delays all incoming transactions to one which selectively delays only those incoming transactions which result in a match as described.

In one embodiment, when a resting order is engaged, and disappears from market data, there may be an incentive for takers to hit the same price again to gain some probability to take the order. It will be understood that the probability of taking the resting order would depend on the market data distribution timing versus deal execution timing. While this generally addresses the issue, there is another factor to discourage this behavior: on a given exchange, such as the EBS Market, there may be about 6,000,000 resting orders submitted per day, where only 60,000 matches are done (other resting orders are cancelled). So, when a resting order disappears from market data, there is only have 1% chance that it was taken (vs. cancelled). In the more complex case where an "engaged" resting order that is engaged to multiple aggressive orders is matched against a new aggressive order. In this case, the disclosed embodiments may take the first engaged order, apply a random selection, e.g. flip a coin, and if it loses, proceed with a rematch, regardless of the other engagements. This implementation may preserve "linearity" of matching. Other algorithms are possible (take the first engaged order, or flip a coin against all engaged orders-possibly taking the age of the engagement to determine the probability).

Figure 6:
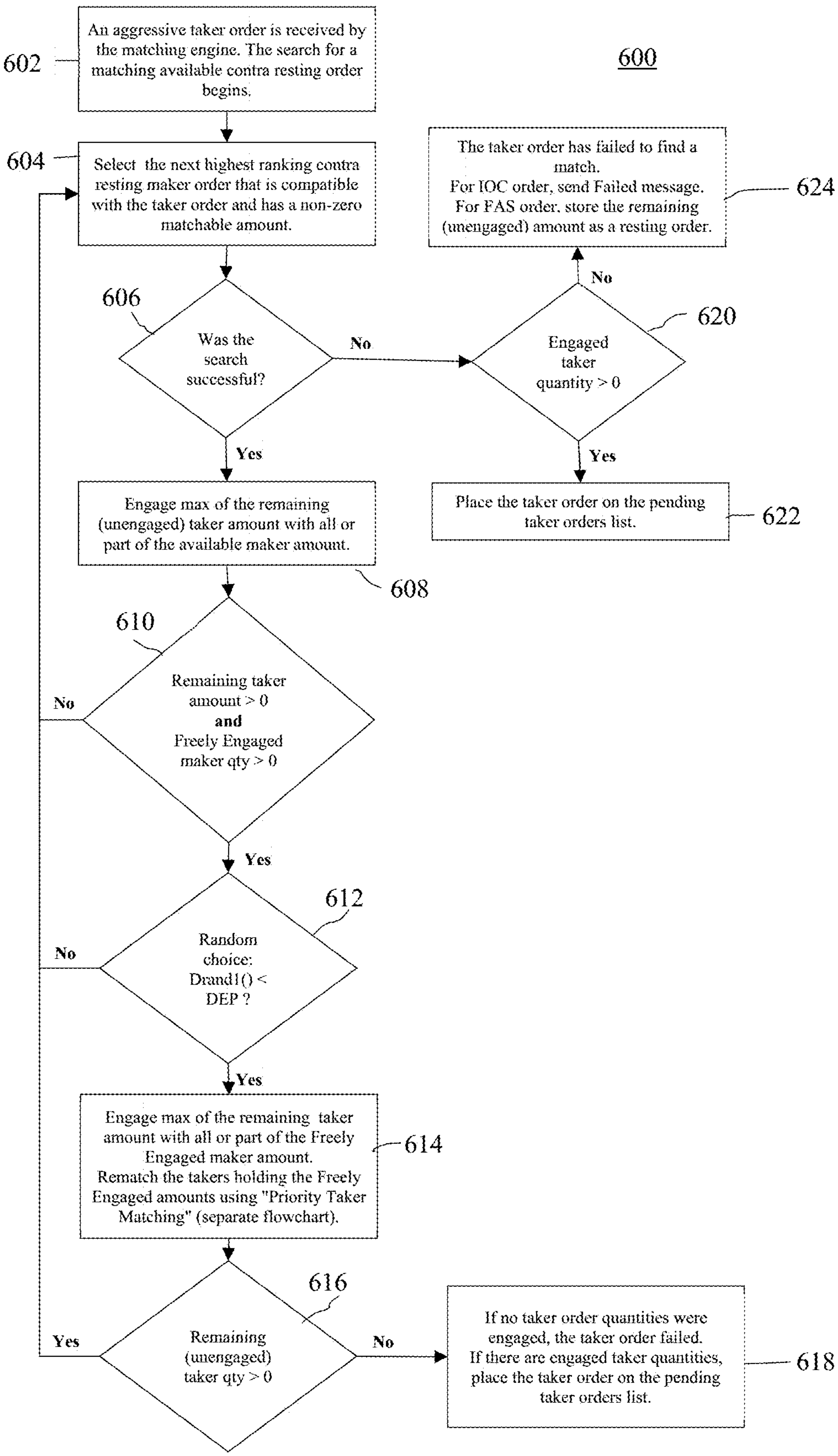
FIGS. 6 and 7 depict a flow chart showing operation of the disclosed embodiments for an aggressive order.
Figure 7:
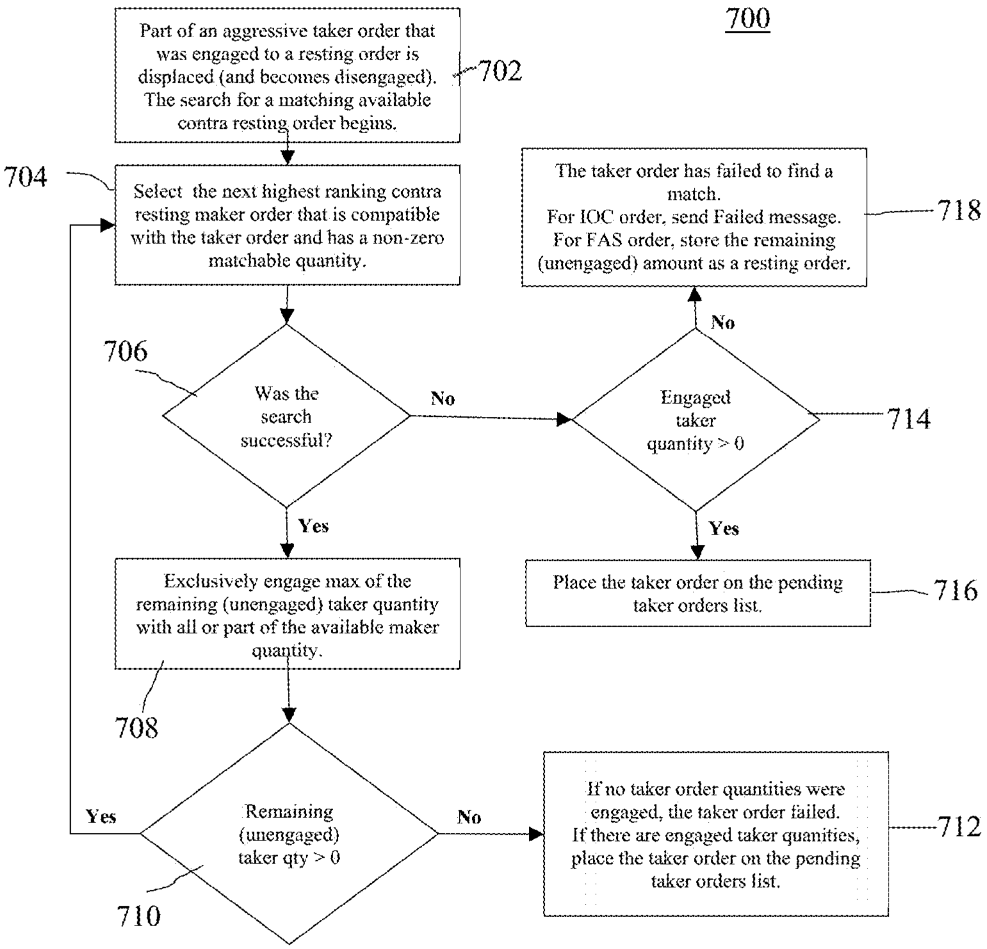

FIGS. 6 and 7 depict a flow chart 600, 700 showing the process of aggressive order matching according to one embodiment as may be implemented by the latency leveling processor 136 describe above. An aggressive/taker order is received by the matching engine 106 causing the matching engine 106 to search for suitable contra resting order (Block 702). The latency leveling processor 136 selects the next highest ranking contra maker order that is counter to the taker order and has a non-zero matchable amount, e.g., available quantity (Block 704). If the search was successful (Block 706), the maximum of the remaining (unengaged) taker quantity is engaged with all or part of the available maker order quantity (Block 708). If the remaining taker quantity is greater than zero and the freely engaged quantity of the maker order is also greater than zero, the process returns to Block 704 (Block 710). Otherwise, if a randomized function is not less than the delayed engagement probability, the process returns to Block 704 (Block 712). However, if a randomized function is less than the delayed engagement probability, the maximum of the remaining taker quantity is engaged with all or part of the freely engaged maker order quantity and the taker(s) holding the freely engaged amounts are re-matched using the priority taker matching process of FIG. 7 (Block 714). If the remaining (unengaged) taker quantity is greater than zero, the process returns to Block 704 (Block 716). Otherwise, if no taker quantities were engaged, the taker order failed and if there are engaged taker quantities, the order is placed on a pending taker order list, e.g. a data structure stored in a memory or as party of the order book database which stores data indicative of engaged orders, including, for example, the time of engagement and/or remaining engagement delay, etc. (Block 718).

If the search was not successful (Block 706), it is determined whether the engaged taker quantity is greater than zero (Block 720) and if so, the taker order is placed on the pending taker order list (Block 722) and, if not, the taker order has failed to find a match and, for an IOC order, send a message indicative of the failure, and for FAS order, store the remaining (unengaged) quantity as a resting order (Block 724).

According to FIG. 7, when part of an aggressive taker order that was engaged to a resting order is displaced (and becomes disengaged), the search for a matching available counter resting order begins (Block 802). The next highest ranking contra resting order that is compatible with the taker order and has non-zero matchable/available quantity is selected (Block 804). If the search was successful (Block 806), the maximum of the remaining (unengaged) taker order quantity may be exclusively engaged with all or part of the available maker order quantity (Block 808). If there is remaining (unengaged) taker quantity, the process returns to Block 804 (Block 810). If not, and no taker opportunities were engaged, the taker order failed but if there are engaged taker quantities, the taker order is placed on the pending taker orders list (Block 812). If the search was unsuccessful (Block 806), it is determined whether the engaged taker quantity is greater than zero (Block 814) and if so, the taker order is placed on the pending taker order list (Block 816) and, if not, the taker order has failed to find a match and, for an IOC order, send a message indicative of the failure, and for FAS order, store the remaining (unengaged) quantity as a resting order (Block 818).

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the implementations. Accordingly, the implementations are not limited except as by the appended claims.

Reference in this specification to "one implementation," "an implementation," or "some implementations" means that a particular feature, structure, or characteristic described in connection with the implementation is included in at least one implementation of the disclosure. The appearances of the phrase "in some implementations" in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various implementations given in this specification.

Those skilled in the art will appreciate that the logic illustrated in each of the flow diagrams discussed above may be altered in various ways. For example, the order of the logic may be rearranged, substeps may be performed in parallel, illustrated logic may be omitted; other logic may be included, etc.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Without intent to further limit the scope of the disclosure, examples of instruments, apparatus, methods and their related results according to the implementations of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A computer implemented method comprising:

receiving, by a processor via an electronic communications network, an electronic order for trading an instrument;

identifying, by the processor in a database coupled therewith, whether stored therein is a previously received, but not yet fully satisfied, electronic order that is counter to the received electronic order; and when a previously received electronic order is identified and is not designated as counter to another previously received electronic order:

storing, by the processor, the received electronic order in the database and designating, by the processor for a period of time, the identified previously received electronic order and the received electronic order as being counter to each other, wherein the identified previously received electronic order and the received electronic order will be removed from the database and executed if the identified previously received electronic order and the received electronic order are still designated therein to each other subsequent to the period of time; and when a previously received electronic order is identified and is designated as being counter to another previously received electronic order:

determining, by the processor, a delayed probability parameter value which, based on a probability function, at least pseudo randomly may be one of first or second values;

wherein when the delayed probability parameter value is determined to be the first value, searching, by the processor, the database for yet another previously received, but not yet fully satisfied, electronic order that is counter to the received electronic order, wherein the designation of the identified previously received electronic order and the other previously received electronic order as being counter to each other remains unmodified; and wherein when the delayed probability parameter value is determined to be the second value, storing, by the processor, the received electronic order in the database and designating, by the processor, the received electronic order as being counter to the identified previously received order in lieu of the other previously received electronic order that is currently designated as being counter thereto and un-designating the other previously received electronic order as being counter to the identified order; and when a previously received, but not yet fully satisfied, electronic order stored in the database that is counter to the received electronic order is not identified, storing, by the processor, the received electronic order in the database.

2. The computerized method of claim 1, wherein the previously received, but not yet fully satisfied, electronic orders stored in the database comprise previously received, but not yet fully satisfied, electronic orders designated as being counter to another previously electronic order for which the period of time has not expired, undesignated previously received, but not yet fully satisfied electronic orders, or any combination thereof.

3. The computerized method of claim 1, wherein previously received, but not yet fully satisfied, electronic orders are arranged in the database in an order of their submission to the processor.

4. The computerized method of claim 1, wherein the identification of a previously received, but not yet fully satisfied, electronic order in the database that matches the received electronic order further comprises:

identifying, by the processor, another previously received, but not yet fully satisfied, electronic order in the database that matches the received electronic order;

determining, by the processor, a difference in submission time of the identified previously received, but not yet fully satisfied, electronic order and submission time of the other previously received, but not yet fully satisfied, electronic order;

when the difference in submission times is greater than a contest time parameter:

matching, by the processor, the identified previously received, but not yet fully satisfied, electronic order with the received electronic order; and when the difference in submission times is less than a contest time parameter:

determining, by the processor, a contest probability parameter value which, based on a probability function, at least pseudo randomly may be one of first or second values; and when the contest probability parameter value is determined to be the first value, matching, by the processor, the other previously received, but not yet fully satisfied, electronic order with the received electronic order; and when the contest probability parameter value is determined to be the second value, matching, by the processor, the identified previously received, but not yet fully satisfied, electronic order with the received electronic order.

5. The computerized method of claim 4, wherein the contest time parameter value is determined dynamically based on currency pair, maker attributes, taker attributes, inter-order delays involved, locality of orders, market conditions, volatility, volume of trades, price fluctuations, or any combination thereof.

6. The computerized method of claim 1 further comprising:

receiving, by the processor via the electronic communications network, an electronic cancellation request of a previously received electronic order stored in the database;

determining, by the processor, a value of a cancellation flag of the previously received electronic order stored in the database;

when the value of the cancellation flag of the electronic order is non-cancellable, not cancelling, by the processor, the previously received electronic order;

when the value of the cancellation flag of the previously received electronic order is cancellable:

determining, by the processor, whether the previously received electronic order is designated as being counter to another previously received electronic order and based thereon:

when the previously received electronic order is not designated as being counter to another previously received electronic order, cancelling, by the processor, the previously received electronic order; and when the previously received electronic order is designated as being counter to another previously received electronic order:

determining, by the processor, an interrupt probability parameter value which, based on at least a pseudo probability function, randomly may be one of first or second values; and when the interrupt probability parameter value is determined to be the first value, cancelling, by the processor, the previously received electronic order; and when the interrupt probability parameter value is determined to be the second value, not cancelling, by the processor, the previously received electronic order and updating, by the processor, the value of the cancellation flag of the previously received electronic order to non-cancellable in the database.

7. The computerized method of claim 6, wherein the interrupt probability parameter value is determined dynamically based on currency pair, maker attributes, taker attributes, inter-order delays involved, locality of orders, market conditions, volatility, volume of trades, price fluctuations, or any combination thereof.

8. The computerized method of claim 1, wherein upon determining, by the processor, that the delayed probability parameter value does not exceed the threshold delayed probability value, the processor further searches the database for a previously received, but not yet fully satisfied, electronic order that is counter to at least a portion of the replaced other previously received electronic order.

9. The computerized method of claim 1, wherein the received electronic order comprises one of an order to buy the instrument or an order to sell an instrument.

10. The computerized method of claim 1, wherein the received electronic order comprises one or more of the following:

instrument name, instrument type, side, price, date of order, quantity, ticker, order type, trade condition, or any combination thereof.

11. The computerized method of claim 1 further comprising displaying, by the processor, data indicative of the received electronic order on an interface coupled with the processor.

12. The computerized method of claim 1, wherein the delayed probability parameter value is determined dynamically based on currency pair, maker attributes, taker attributes, inter-order delays involved, locality of orders, market conditions, volatility, volume of trades, price fluctuations, or any combination thereof.

13. The computerized method of claim 1, wherein the period of time is determined dynamically based on currency pair, maker attributes, taker attributes, inter-order delays involved, locality of orders, market conditions, volatility, volume of trades, price fluctuations, or any combination thereof.

14. A computerized trading system comprising:

a processor coupled to a network; and at least one memory, coupled to the processor, and carrying instructions to be executed by the processor, which when executed by the processor cause the processor to:

receive, via an electronic communications network, an electronic order for trading an instrument;

identify, in a database coupled with the processor, whether stored therein is a previously received, but not yet fully satisfied, electronic order that is counter to the received electronic order; and when a previously received electronic order is identified and is not designated as counter to another previously received electronic order:

store the received electronic order in the database and designate, for a period of time, the identified previously received electronic order and the received electronic order as being counter to each other, wherein the identified previously received electronic order and the received electronic order will be removed from the database and executed if the identified electronic order and the received electronic order are still designated therein to each other subsequent to the period of time; and when a previously received order is identified and is designated as being counter to another previously received electronic order:

determine a delayed probability parameter value which, based on a probability function, at least pseudo randomly may be one of first or second values;

wherein when the delayed probability parameter value is determined to be the first value, search the database for yet another previously received, but not yet fully satisfied, electronic order that is counter to the received electronic order, wherein the designation of the identified previously received electronic order and the other previously received electronic order as being counter to each other remains unmodified; and wherein when the delayed probability parameter value is determined to be the second value, store the received electronic order in the database and designate the received electronic order as being counter to the identified previously received order in lieu of the other previously received electronic order that is currently designated as being counter thereto and un-designate the other previously received electronic order as being counter to the identified previously received order; and when a previously received, but not yet fully satisfied, electronic order stored in the database that is counter to the received electronic order is not identified, store the received electronic order in the database.

15. The computerized trading system of claim 14, wherein the identification of a previously received, but not yet fully satisfied, order in the database that matches the received electronic order further comprises:

identification of another previously received, but not yet fully satisfied, electronic order in the database that matches the received electronic order;

determination of a difference in submission time of the identified previously received, but not yet fully satisfied, electronic order and submission time of the other previously received, but not yet fully satisfied, electronic order;

when the difference in submission times is greater than a contest time parameter:

match the identified previously received, but not yet fully satisfied, electronic order with the received electronic order; and when the difference in submission times is less than a contest time parameter:

determination of a contest probability parameter value which, based on a probability function, at least pseudo randomly may be one of first or second values; and when the contest probability parameter value is determined to be the first value, match the other previously received, but not yet fully satisfied, electronic order with the received electronic order; and when the contest probability parameter value is determined to be the second value, match the identified previously received, but not yet fully satisfied, electronic order with the received electronic order.

16. The computerized trading system of claim 14, wherein the instructions further comprise instructions which when executed by the processor, cause the processor to:

receive, via the electronic communications network, an electronic cancellation request of a previously received electronic order store in the database;

determine a value of a cancellation flag of the previously received electronic order;

when the value of the cancellation flag of the electronic order is non-cancellable, not cancel the previously received electronic order;

when the value of the cancellation flag of the previously received electronic order is cancellable:

determine whether the previously received electronic order is designated as being counter to another previously received order and based thereon:

when the previously received electronic order is not designated as being counter to another previously received electronic order, cancel the electronic order; and when the previously received order is designated as being counter to another previously received electronic order:

determine an interrupt probability parameter value which, based on at least a pseudo probability function, randomly may be one of first or second values; and when the interrupt probability parameter value is determined to be the first value, cancel the previously received electronic order; and when the interrupt probability parameter value is determined to be the second value, not cancel the previously received electronic order and update the value of the cancellation flag of the previously received electronic order to non-cancellable in the database.

17. The computerized trading system of claim 14, wherein previously received, but not yet fully satisfied, electronic orders are arranged in the database in an order of their submission to the processor.

18. The computerized trading system of claim 14, wherein upon the determination that the delayed probability parameter value does not exceed the threshold delayed probability value, the instructions are further executable by the processor to cause the processor to search the database for a previously received, but not yet fully satisfied, electronic order that is counter to at least a portion of the replaced other previously received electronic order.

19. A system comprising:

a latency leveling processor coupled with a matching engine of an electronic trading system, the matching engine comprising a database in which previously received but not fully satisfied data transaction requests are stored, the latency leveling processor being operative, for an incoming data transaction request comprising an order for a quantity to:

for a previously received but unsatisfied data transaction request stored in the database that is identified by the matching engine as being counter to the incoming data transaction request:

where the identified previously received but unsatisfied data transaction request was previously identified by the matching engine as being counter to a previously received incoming data transaction request, determine, based on a first pseudo probability function which produces a value which randomly may or may not exceed a threshold value, whether, based on whether or not the value exceeds the threshold value, to one of cause the matching engine to replace the previously received incoming data transaction request with the incoming transaction request or not cause the matching engine to replace the previously received incoming data transaction request with the incoming transaction request; and where the identified previously received but unsatisfied data transaction request was not previously identified by the matching engine as being counter to a previously received incoming data transaction request, delay completion of the match and removal from the database by the matching engine of the incoming data transaction request with the identified previously received but unsatisfied data transaction request for a period of time; and where a previously received but unsatisfied data transaction request stored in the database is not identified as being counter to the incoming data transaction request, not preventing the matching engine from storing the incoming data transaction request in the database.

20. The system of claim 19 wherein:

the latency leveling processor being further operative, for an incoming data transaction request comprising a cancellation of a previously received data transaction request currently stored in the database, to:

determine whether the previously received data transaction request to be canceled has been identified as being counter to a previously received incoming data transaction request; and where the previously received data transaction request has been identified as being counter to a previously received incoming data transaction request, determine, based on a second pseudo probability function, whether to one of cause the matching engine to remove the previously received data transaction request from the database or not cause the matching engine to remove the previously received data transaction request from the database; and where the previously received data transaction request has not been identified as being counter to a previously received incoming data transaction request, cause the matching engine to remove the previously received data transaction request from the database.

* * * * *